US011128515B2

(12) United States Patent
Park et al.

(10) Patent No.: US 11,128,515 B2
(45) Date of Patent: Sep. 21, 2021

(54) EXTREME HIGH THROUGHPUT FUTURE PROOF PREAMBLE DESIGN

(71) Applicant: Intel Corporation, Santa Clara, CA (US)

(72) Inventors: Minyoung Park, San Ramon, CA (US); Xiaogang Chen, Portland, OR (US); Laurent Cariou, Portland, OR (US); Po-Kai Huang, San Jose, CA (US); Thomas J. Kenney, Portland, OR (US); Qinghua Li, San Ramon, CA (US); Robert J. Stacey, Portland, OR (US); Feng Jiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/728,282

(22) Filed: Dec. 27, 2019

(65) Prior Publication Data
US 2020/0136884 A1 Apr. 30, 2020

Related U.S. Application Data

(60) Provisional application No. 62/840,721, filed on Apr. 30, 2019, provisional application No. 62/858,637, filed on Jun. 7, 2019.

(51) Int. Cl.
*H04L 27/26* (2006.01)
*H04W 84/12* (2009.01)

(52) U.S. Cl.
CPC ...... *H04L 27/2692* (2013.01); *H04L 27/2607* (2013.01); *H04L 27/2663* (2013.01); *H04L 27/2665* (2013.01); *H04W 84/12* (2013.01)

(58) Field of Classification Search
CPC ........ H04B 7/06; H04B 7/0452; H04B 17/10; H04J 3/06; H04J 11/00; H04L 1/00;
(Continued)

(56) References Cited

U.S. PATENT DOCUMENTS

2020/0076552 A1* 3/2020 Cherian ............ H04W 72/0426
2020/0396743 A1* 12/2020 Park ........................ H04L 29/08
(Continued)

OTHER PUBLICATIONS

S. Vermani (Qualcomm) "Preamble Design Harmonization across Generations" (Year: 2019).*
X. Chen (Intel) "11be Preamble Structure" (Year: 2019).*

*Primary Examiner* — Shawkat M Ali
(74) *Attorney, Agent, or Firm* — Schwegman Lundberg & Woessner, P.A.

(57) ABSTRACT

Methods, apparatuses, and computer readable media for a common preamble for wireless local-area networks (WLANs). An apparatus of an access point (AP) or station (STA) comprising processing circuitry configured to decode a portion of a physical layer (PHY) protocol data unit (PPDU), the first portion of the PPDU including a physical universal signal field (U-SIG), the U-SIG comprising a version independent portion and a version dependent portion, the version independent portion including a version identifier field, the version identifier field indicating a standard version of the PPDU. The processing circuitry is further configured to refrain from decoding the version dependent portion when the standard version indicates a standard version of a later generation than a standard version of the AP or STA, and otherwise decode the version dependent portion in accordance with the standard version.

20 Claims, 19 Drawing Sheets

(58) Field of Classification Search
CPC ......... H04L 5/00; H04L 12/26; H04L 12/805; H04L 27/26; H04L 27/2607; H04L 27/2636; H04L 27/2665; H04L 27/2692; H04W 4/40; H04W 12/00; H04W 28/06; H04W 40/24; H04W 52/02; H04W 52/36; H04W 72/00; H04W 72/04; H04W 74/00; H04W 84/12
USPC ......................... 375/219, 260, 267, 295, 316
See application file for complete search history.

(56) References Cited

U.S. PATENT DOCUMENTS

2021/0006444 A1\* 1/2021 Jang .................... H04L 27/2603
2021/0045151 A1\* 2/2021 Chen .................... H04L 5/0091

\* cited by examiner

BSS

EXTREME HIGH THROUGHPUT FUTURE PROOF PREAMBLE DESIGN

PRIORITY CLAIM

This application claims the benefit of priority under 35 USC 119(e) to U.S. Provisional Patent Application Ser. No. 62/840,721, filed Apr. 30, 2019, and to U.S. Provisional Patent Application Ser. No. 62/858,637, filed Jun. 7, 2019, each of which is incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to a common preamble or signal field (SIG).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
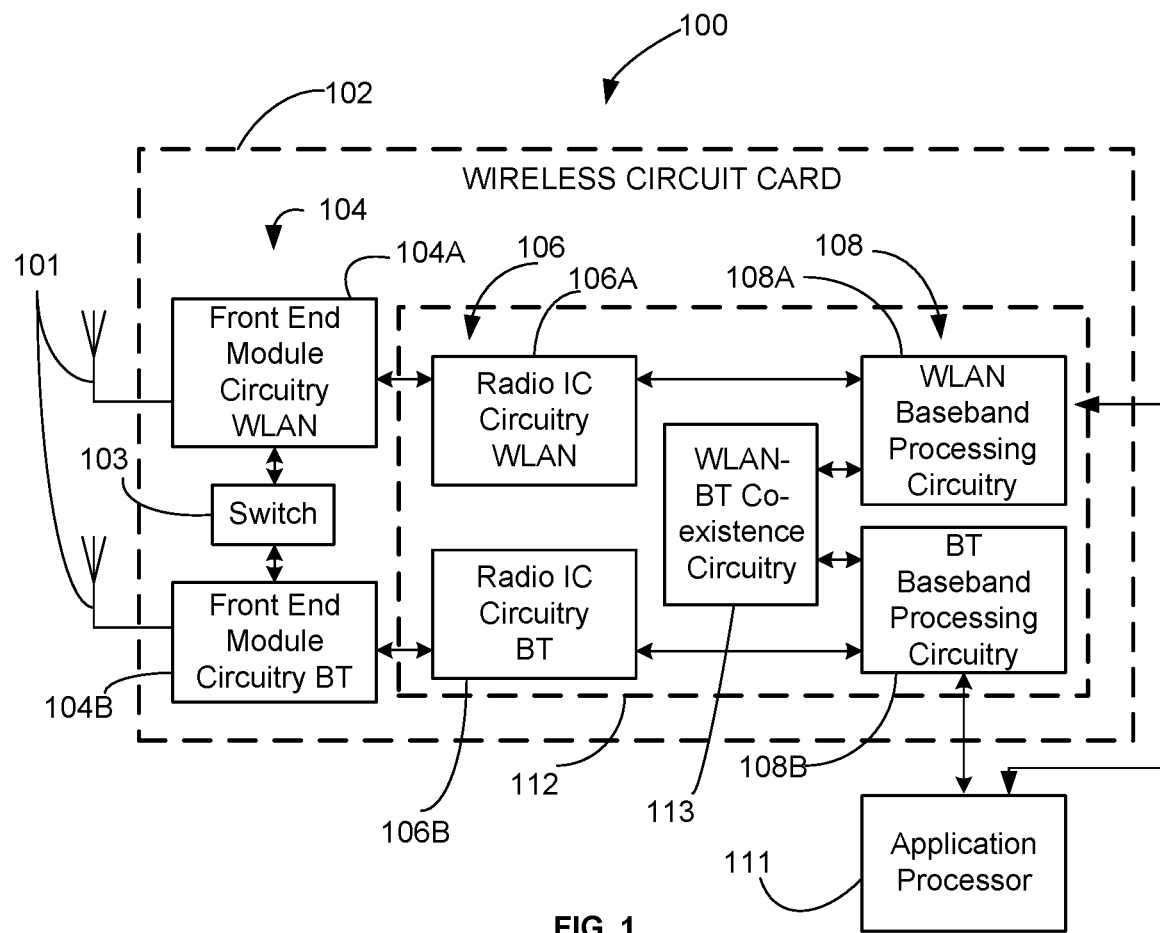
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include BT functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
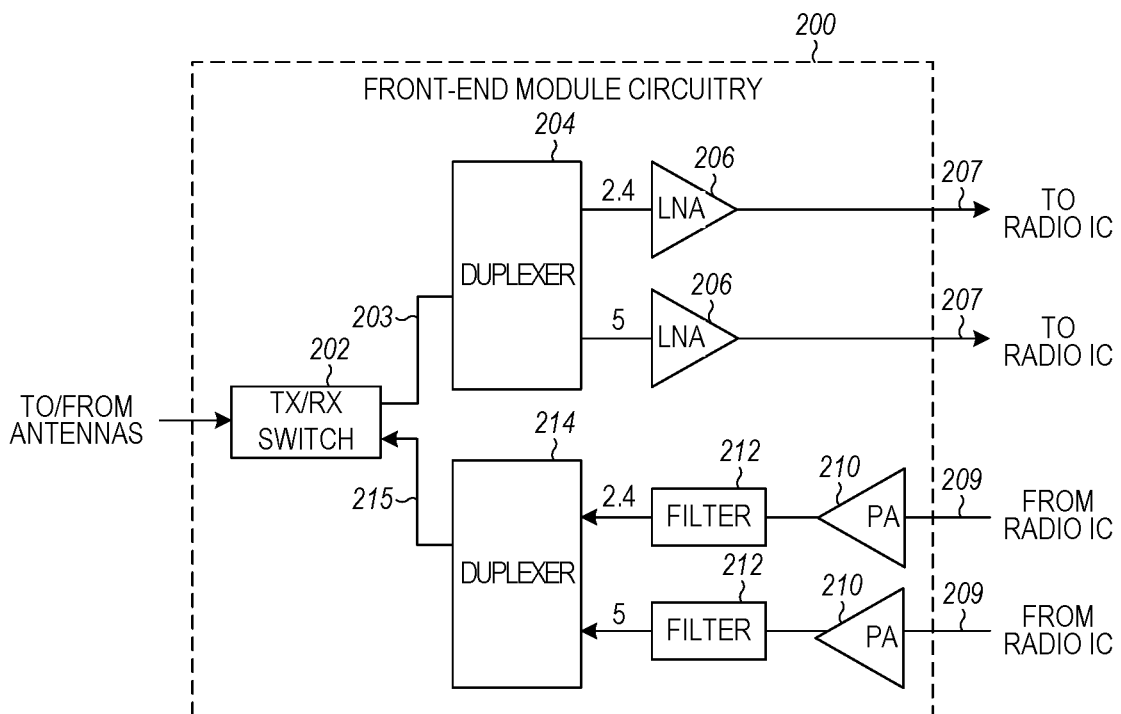
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
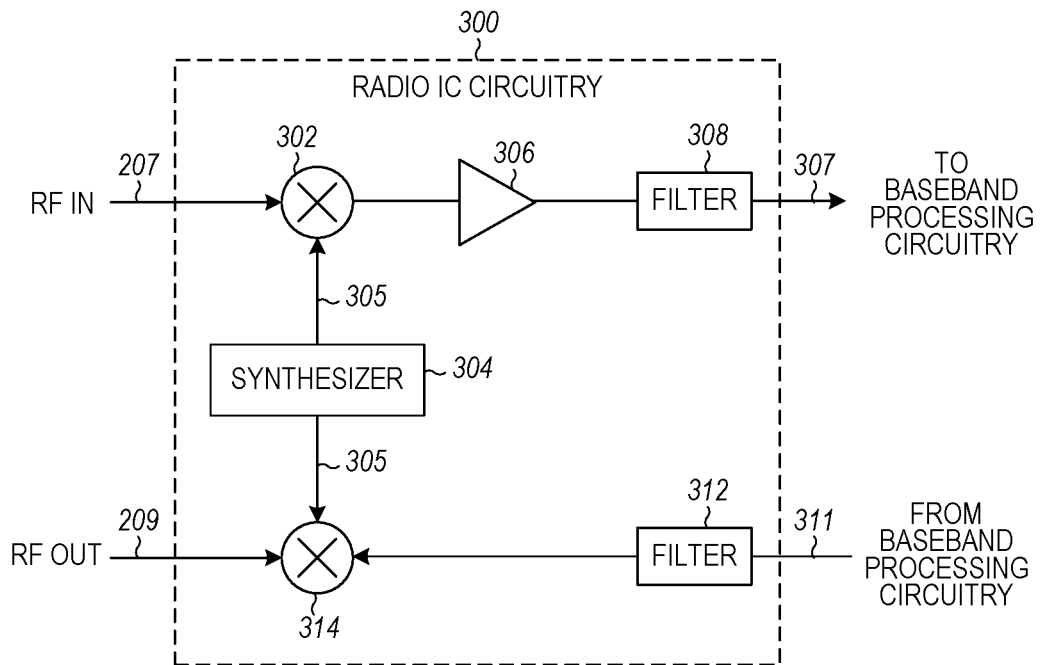
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
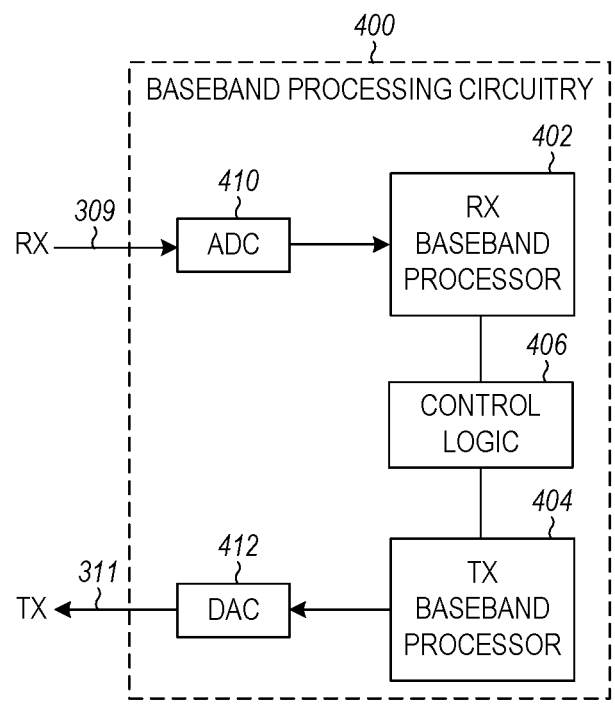
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
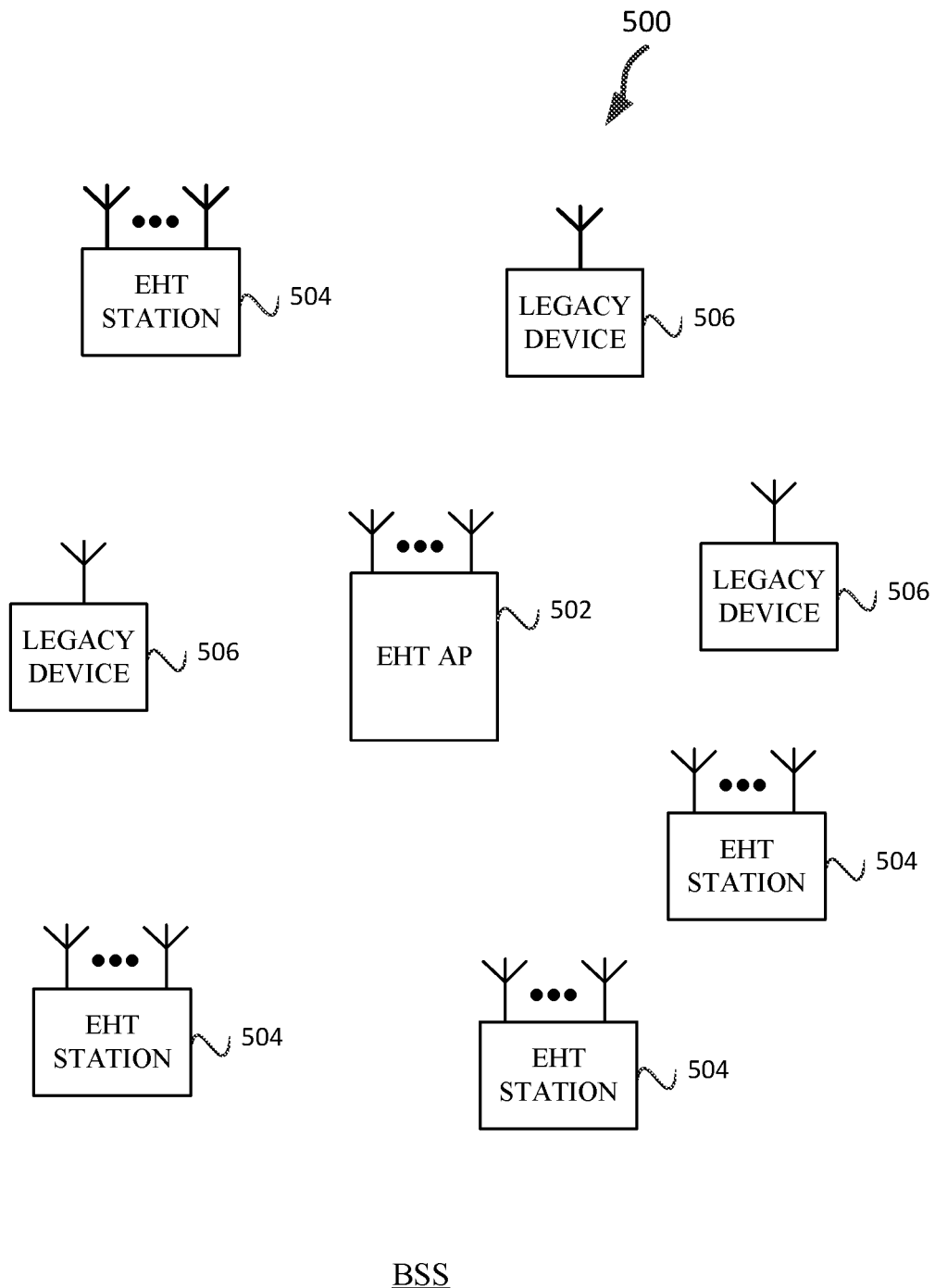
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11EHT may be termed Next Generation 802.11. In some embodiments, the EHT AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-23.

In example embodiments, the EHT station 504 and/or the EHT AP 502 are configured to perform the methods and operations/functions described herein in conjunction with FIGS. 1-23. In example embodiments, an apparatus of the EHT station 504 and/or an apparatus of the EHT AP 502 are configured to perform the methods and functions described herein in conjunction with FIGS. 1-23. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAB 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11 be or may be designated another name.

Figure 6:
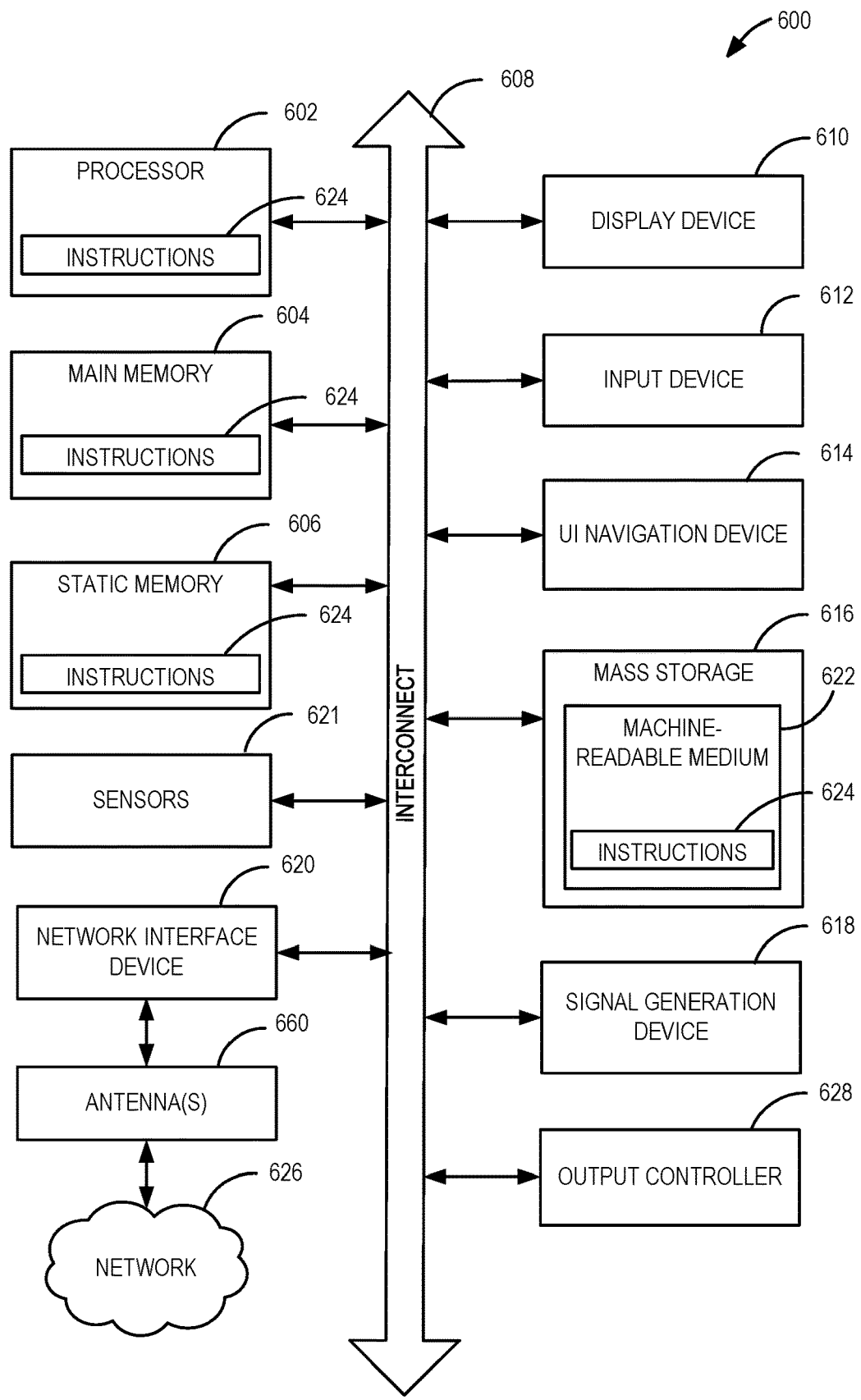
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
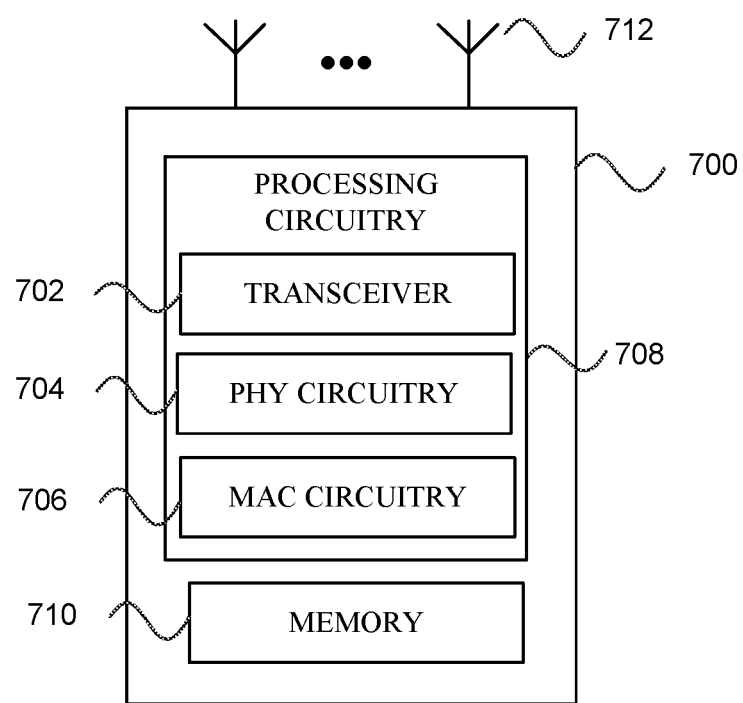
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem in IEEE 802.11 is how to integrate a new generation with the old generations. A new amendment often requires new SIG fields that include information to support new physical (PHY)/ media access control (MAC) features for the new amendment. The new SIGs are placed after the L-SIG field so that legacy device 506 will decode the L-SIG and determine a length of the PPDU or packet and defer from transmitting for a time based on the length. When new SIG fields have been defined in a new amendment, for example the IEEE 802.11ax HE-SIG-A, only devices that support IEEE 802.11ax and any follow-on amendments (e.g. IEEE 802.11be) can decode the information in the HE-SIG-A field. Pre-IEEE 802.11ax devices (e.g. legacy device 506) are not able to decode later generation SIG field as they do not know the format to decode the later generation SIG field, e.g., HE-SIG-A or EHT-SIG. However, some of the information (e.g., BSS color, TxOP duration, bandwidth) in later generation SIGs (e.g., HE-SIGA or EHT-SIG) needs to be signaled in future amendments for coexistence, e.g., intra-physical layer (PHY) protocol data unit (PPDU) PPDU power save.

Some embodiments improve coexistence among different IEEE 802.11 STAs (e.g., EHT STAs 504 and HE STAs) and therefore improve overall network efficiency and enable power saving. For example, in some embodiments, intra-PPDU power saving and spatial reuse are improved by providing a common preamble with a common SIG field that also may reduce detection and classification of PPDUs.

Figure 8:
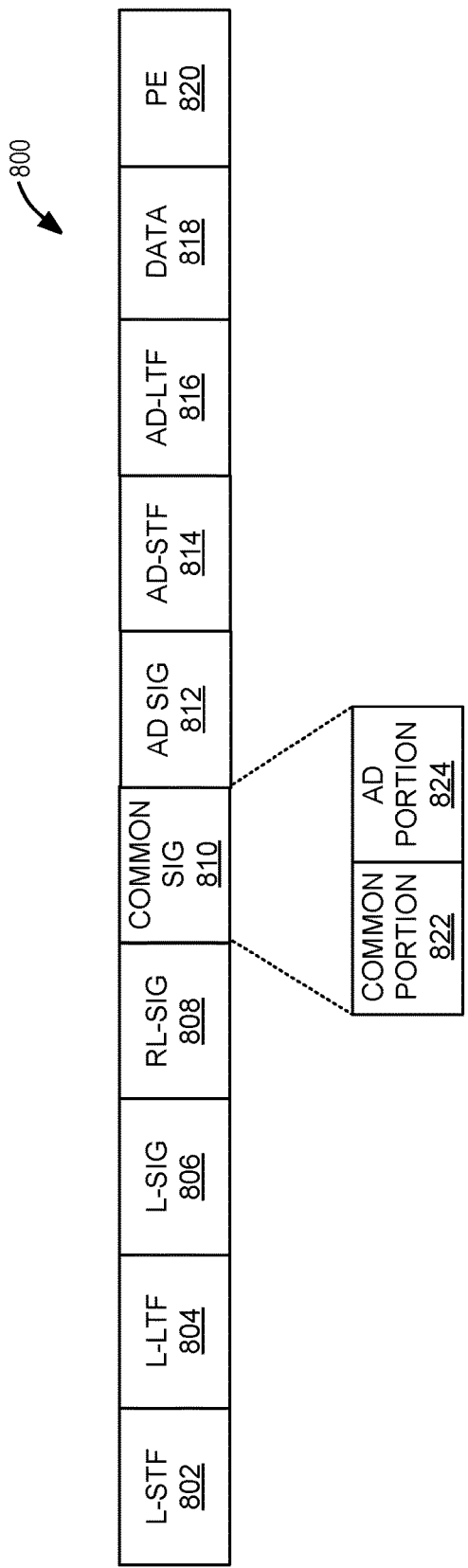
FIG. 8 illustrates a PPDU with a common SIG in accordance with some embodiments.

FIG. 8 illustrates a PPDU 800 with a common SIG in accordance with some embodiments. Illustrated in FIG. 8 is PPDU 800, which includes one or more of non-HT short training field (L-STF 802), Non-HT Long Training field (L-LTF 804), Non-HT SIGNAL field (L-SIG 806), Repeated Non-HT SIGNAL field (RL-SIG 808), common SIG 810, amendment dependent (AD) SIG 812, AD-STF 814, AD-LTF 816, data field carrying one or more PSDUs (data 818), and packet extension field (PE 820). The common SIG 810 includes common portion 822 and AD portion 824, in accordance with some embodiments. The common portion 822 is the same or similar as version independent bits 1000 (FIG. 10), in accordance with some embodiments. In some embodiments, the common portion 822 and AD portion 824 are separately encoded with separate error detecting/correcting codes (e.g., cyclic redundancy check, CRC codes) and tail bits. In some embodiments, the common portion 822 and AD portion 824 are encoded together that includes a CRC field and, in some embodiments, a tail bits field. The AD SIG 812, AD-STF 814, AD-LTF 816, data 818, and PE 820 are a fields for the particular amendment that is indicated by the common fields 822, e.g., EHT.

Figure 9:
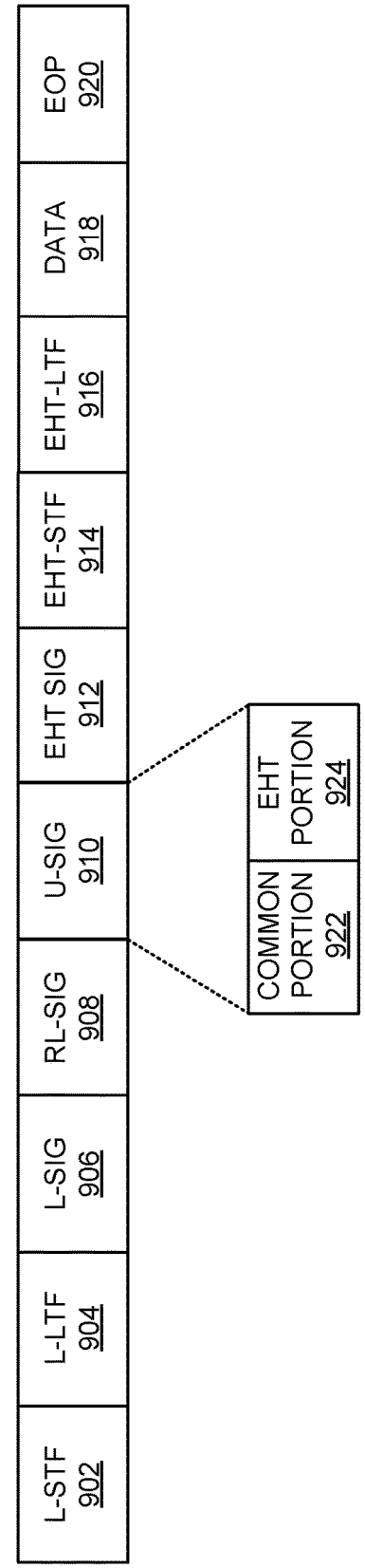
FIG. 9 illustrates a PPDU with a universal SIG field (U-SIG) 910, in accordance with some embodiments.

FIG. 9 illustrates a PPDU 900 with a universal SIG field (U-SIG) 910, in accordance with some embodiments. The PPDU 900 comprises one or more of L-STF 902, L-LTF 904, L-SIG 906, RL-SIG 908, U SIG 910, EHT SIG 912, EHT-STF 914, EHT-LTF 916, data field carrying one or more PSDUs (data 918), and PE 920. The U-SIG 910 includes common portion 922 and EHT portion 924, in accordance with some embodiments. The common portion 922 is the same or similar as version independent bits 1000 (FIG. 10), in accordance with some embodiments. In some embodiments, the common portion 922 and EHT portion 924 are separately encoded with separate error detecting/correcting codes (e.g., cyclic redundancy check, CRC codes) and tail bits. In some embodiments, the common portion 22 and AD portion 824 are encoded together that includes a CRC field and tail bits field. The EHT SIG 912, EHT-STF 914, EHT-LTF 916, data 918, and PE 920 are a fields for IEEE 802.11be or EHT. IEEE 802.11be or EHT is indicated in the common fields 922, in accordance with some embodiments. In some embodiments, for extended range mode one or more of the subfield may be repeated.

In some embodiments, the common SIG subfield 810 or U-SIG subfield 910 includes a CRC (e.g., 1014) and tail bits (not illustrates) so that the U-SIG subfield 910 is decodable by itself and a STA does not need to understand the amendment specific SIG field (e.g., AD SIG 812 or EHT SIG 912). In some embodiments, future amendments will include the common SIG subfield 810 or U-SIG 910 before their new SIG field design. In some embodiment, the common SIG subfield 810 or U-SIG 910 is encoded together with the amendment specific SIG field (e.g., AD SIG 812 or EHT SIG 912) but some of the common SIG subfield 810 or U-SIG 910 subfield, e.g. one or more of the following subfields may have a fixed bit index but other subfields may have a non-fixed bit index: amendment type 1002, PPDU type 1004, BSS color 1006, TXOP 1008, and/or UL/DL flag 1010.

Figure 10:
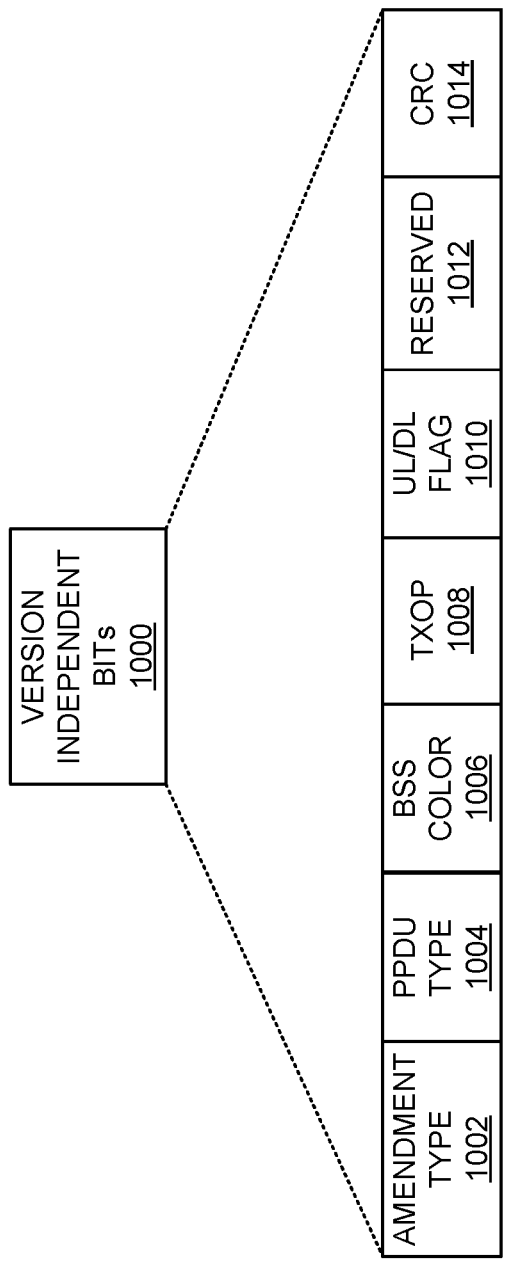
FIG. 10 illustrates version independent bits, in accordance with some embodiments.

FIG. 10 illustrates version independent bits 1000, in accordance with some embodiments. The version independent bits 1000 are part of common SIG 810 and/or U-SIG 910, in accordance with some embodiments. Version independent bits 1000 includes one or more of amendment type subfield 1002, PPDU type subfield 1004, BSS color subfield 1006, transmission opportunity (TXOP) subfield 1008, uplink/downlink (UL/DL) subfield 1010, reserved subfield 1012, and CRC subfield 1014. The version independent bits 1000 may include one or more additional subfields, e.g., tail bits.

The amendment type subfield 1002 indicates which amendment (e.g., EHT/be) and may be 2 to 8 bits, in accordance with some embodiments. In some embodiments, the amendment type subfield 1002 is three (3) bits.

The BSS color subfield 1006 indicates whether the PPDU (e.g., 800 or 900) is from the STA's associated BSS or from an overlapping BSS (OBSS). In some embodiments, the value of the BSS color subfield 1006 is the same or similar as the BSS color that would be indicated by a HE-SIG-A field. In some embodiment the location of the bits for the BSS color subfield 1006 are fixed in the common SIG field 810 and/or U-SIG 910. In some embodiments the number of bits of the BSS color subfield 1006 are 2 to 12 bits (or more.) In some embodiments, the BSS color subfield 1006 indicates a color as disclosed in the IEEE 802.11be specification.

The TXOP subfield 1008 indicates time duration of a TXOP. The time duration may be used for correct network availability vector (NAV) setting by the STA or AP decoding the TXOP subfield 1008. In some embodiments, the TXOP subfield 1008 is present when the common SIG field 810 or U-SIG 910 is 2 OFDM symbols (i.e. 56 bit information). In some embodiments, if the common SIG subfield 810 or U-SIG subfield 910 is one symbol, then the TXOP subfield 1008 is not included. In some embodiments, the TXOP subfield 1008 is 7 bits or more. The UL/DL flag 1010 indicates whether the PPDU (e.g., 800 or 900) is an UL or DL PPDU, in accordance with some embodiments.

The reserved subfield 1012 are bits that are not assigned to be made available for future assignments. The CRC subfield 1014 is a CRC (e.g., CRC4-6) that is calculated from subfields of the common SIG subfield 810 or U-SIG subfield 910. In accordance with some embodiments, the subfields include one or more of the following subfields: amendment type subfield 1002, PPDU type subfield 1004, BSS color subfield 1006, TXOP subfield 1008, UL/DL flag 1010 subfield, reserved subfield 1012, and length field (not illustrated) of L-SIG (e.g., 806 or 906).

Some embodiments enable later amendments to be signaled via the amendment type subfield 1002 and for the later amendments after 802.11be to be able to decode the common portion 822, 922. Thus, information can be shared by future amendment types previous amendment types where the information may include one or more of BSS color, TxOP, bandwidth, etc. The sharing of the information may enable coexistence among amendment types which is not possible with among previous amendment types.

Figure 11:
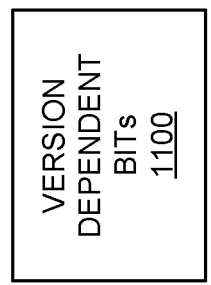
FIG. 11 illustrates version dependent bits, in accordance with some embodiments.

FIG. 11 illustrates version dependent bits 1100, in accordance with some embodiments. The version dependent bits 1100 are part of common SIG 810 and/or U-SIG 910, in accordance with some embodiments. Version dependent bits 1100 includes one or more subfields that are dependent on the version. The version dependent bits 1100 may include one or more additional subfields, e.g., CRC and/or tail bits. The version dependent bits 1100 may be the same or similar as AD portion 824 and/or EHT portion 924. The version dependent bits 1100 are encoded separately from the version independent bits 1000, in accordance with some embodiments. The version dependent bits 1100 are encoded with the version independent bits 1000, in accordance with some embodiments. The version dependent bits 1100 are encoded with a portion of the EHT SIG subfield 912 and/or a portion of the AD SIG 812 subfield, in accordance with some embodiments. The version dependent BITs 1100 may include information such as the MCS of the later version dependent SIGs, data, PSDUs, etc.

Figure 12:
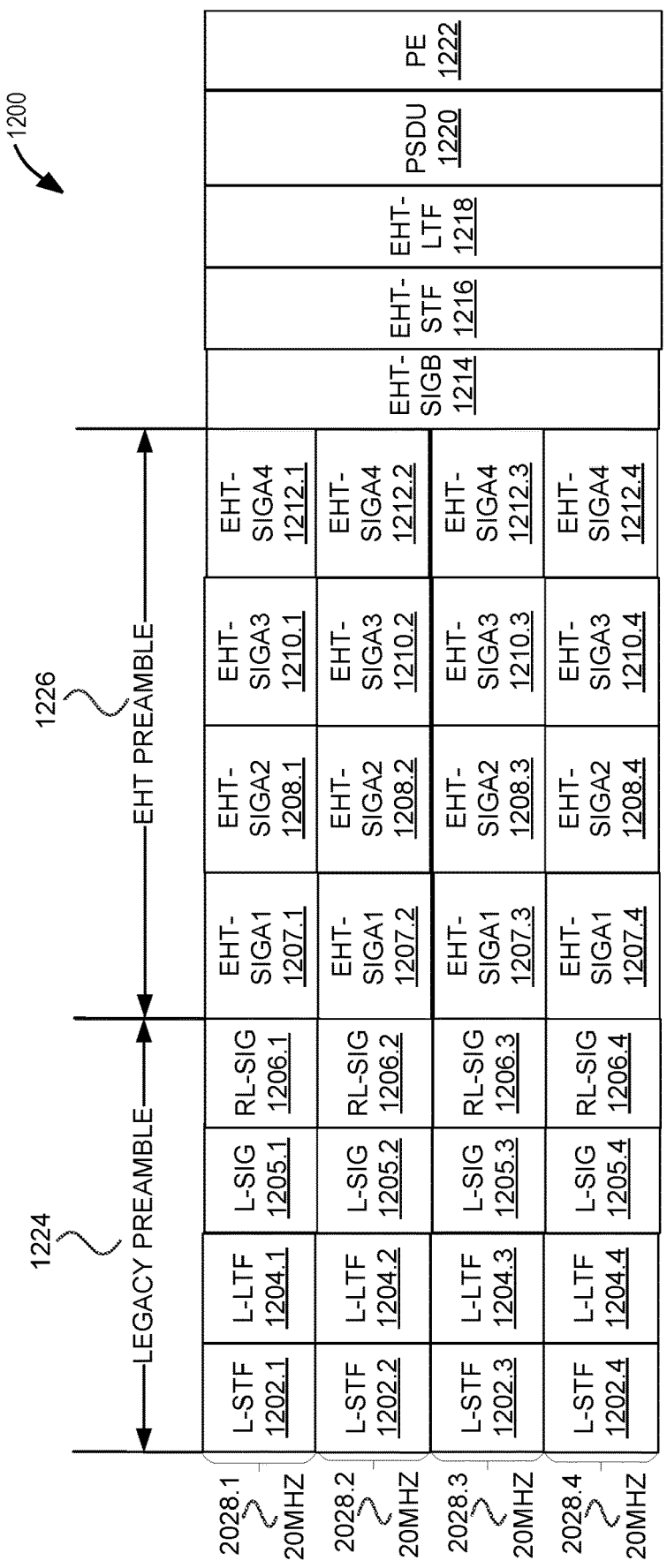
FIG. 12 illustrates a PPDU, in accordance with some embodiments.

FIG. 12 illustrates a PPDU 1200, in accordance with some embodiments. Illustrated in FIG. 12 is L-STF 1202, L-LTF 1204, L-SIG 1205, RL-SIG 1206, EHT-SIGA1 1207, EHT-SIGA2 1208, EHT-SIGA3 1210, EHT-SIGA4 1212, EHT-SIGB 1214, EHT-STF 1216, EHT-LTF 1218, PSDU 1220, PE 1222, legacy preamble 1224, EHT preamble 1226, and 20 MHz 2028.1 through 20 MHz 2028.4. L-STF 1202, L-LTF 1204, L-SIG 1205, and RL-SIG 1206 are the same or similar as L-STF 802, 902, L-LTF 804, 904, L-SIG 806, 906, and RL-SIG 808, 908, respectively. The legacy preamble 1224 and EHT preamble 1226 is transmitted on each 20 MHz channel 2028 and EHT-SIGB 1214 through PE 1222 are transmitted on the entire 80 MHz channel, in accordance with some embodiments. The legacy preamble 1224 may be the same or similar as a preamble for IEEE 802.11ax. EHT-SIG1 1207, EHT-SIGA2 1208, EHT-SIGA3 1210, and EHT SIGA4 1212 are four symbols of the EHT preamble 1226. In some embodiments, EHT-SIG1 1207, EHT-SIGA2 1208, EHT-SIGA3 1210, and EHT SIGA4 1212 are transmitted in accordance with BPSK. In some embodiments, EHT-SIG1 1207, EHT-SIGA2 1208, EHT-SIGA3 1210, and EHT SIGA4 1212 are the same or similar as common SIG 810 and AD SIG 812 and/or U-SIG 910 and EHT SIG 912. In some embodiments, EHT-SIG1 1207, EHT-SIGA2 1208, EHT-SIGA3 1210, and EHT SIGA4 1212 are the same or similar as U-SIG 910 and EHT SIG 912. In some embodiments, EHT-SIG1 1207, EHT-SIGA2 1208, EHT-SIGA3 1210, and EHT SIGA4 1212 are the same or similar as version independent BITs 1000 and version dependent BITs 1100. In some embodiments, EHT-SIG1 1207, EHT-SIGA2 1208, EHT-SIGA3 1210, and EHT SIGA4 1212 comprise one CRC and tail bits.

In some embodiments, the common SIG 810 and AD SIG 812 and encoded together so there is not two CRCs and tail bits, which may save at least 10 bits). In some embodiments, EHT-SIG1 1207, EHT-SIGA2 1208, EHT-SIGA3 1210 include one or of: BSS color subfield 1006, TXOP subfield 1008, or another field as disclosed in conjunction with FIG. 10. The bit positions of the subfields may be fixed. So that EHT (EHT STA 504 and/or EHT AP 502) and post EHT device can decode these common information. For all of the amendment specific information, the bit index doesn't need to be fixed, and can only be interpreted and parsed by an amendment specific STA (e.g. IEEE 802.11be STA or a future generation STA). The format is differentiated by the amendment/PPDU type which indicates the PPDU designed for a specific amendment. In some embodiments, EHT-SIG1 1207 includes a length symbol to indicate a number of symbols in the EHT preamble 1226.

Figure 13:
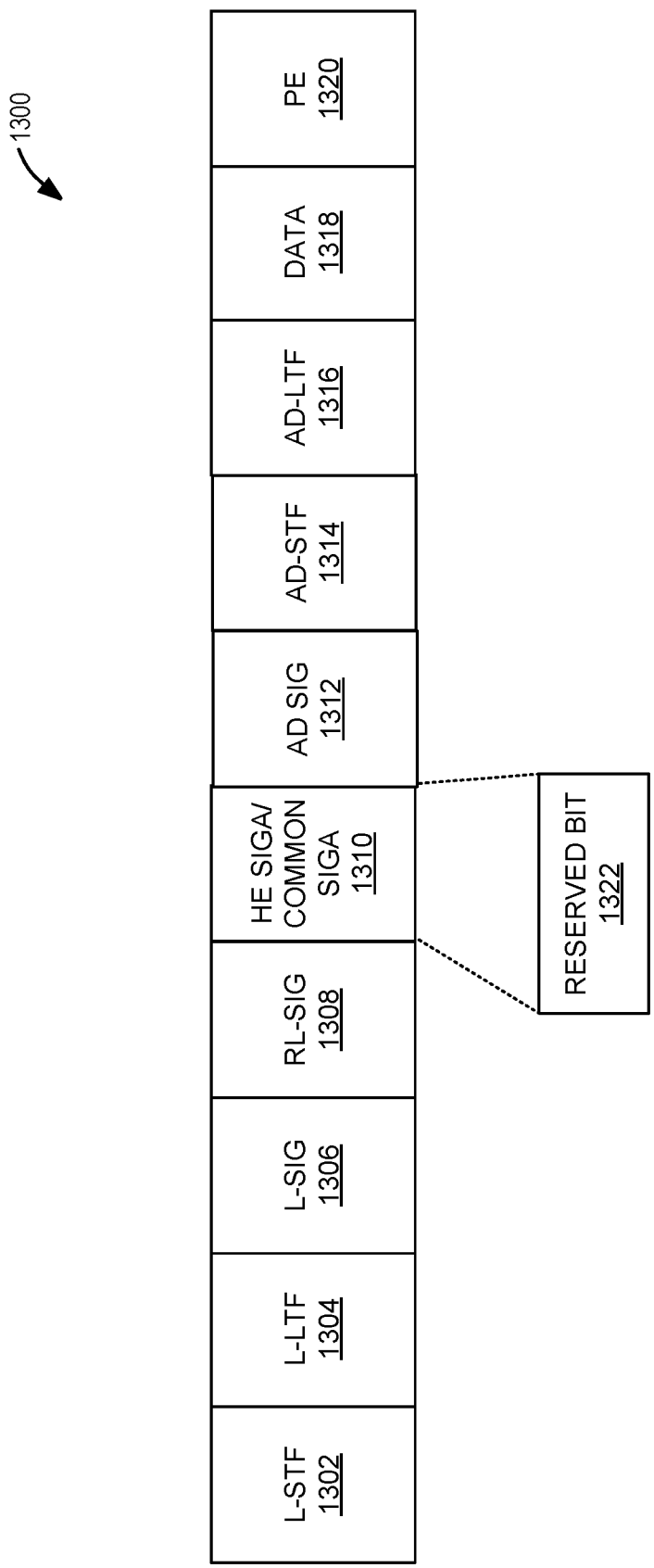
FIG. 13 illustrates a PPDU with a HE SIGA/common SIGA 1310 in accordance with some embodiments.

FIG. 13 illustrates a PPDU 1300 with a HE SIGA/common SIGA 1310 in accordance with some embodiments. Illustrated in FIG. 13 is PPDU 1300, which includes one or more of L-STF 1302, L-LTF 1304, L-SIG 1306, RL-SIG 1308, HE SIGA/Common SIG 1310, AD SIG 1312, AD-STF 1314, AD-LTF 1316, data field carrying one or more PSDUs (data 1318), and PE 1320. The HE SIGA/common SIG 1310 reserved bit 1322. The reserved bit 1322 indicates whether the SIGA/common SIG 1310 is for IEEE 802.11ax or a later amendment, e.g., EHT. In some embodiments, the HE SIGA/common SIGA field 1310 is 2 symbols. If the PPDU 1300 is HE (e.g., the reserved bit 1322=1), then design of this common SIGA field is identical to currently defined HE-SIGA. If the reserved bit 1322 is set to 0, indicating a future amendment, e.g., EHT, then the design of this common SIG field can be designed by repurposing parts of HE-SIGA. In this design the BSS Color, TXOP duration fields, and possibly other fields are kept unchanged (same bit location) and always parsed whether the reserved bit is set to the reserved value (1) or to the non-reserved value (0). All the other fields/bits in the HE SIGA/Common SIGA field 1310 can be redesigned, if needed, but it is likely other fields could remain the same as well since they will need to be conveyed in future amendments. Some fields can be repurposed to indicate the amendment/PPDU type designed by the future amendment. Additionally, following these two SIGA symbols there can be an Amendment Specific SIG symbols that immediately follows the HE-SIGA, e.g., AD SIG 1312, and that will provide information specific to this new amendment. The existence is signaled by the amendment/PPDU type field, in accordance with some embodiments. This design enables being able to always use BSS color and TxOP duration fields, with the benefit that IEEE 802.11ax devices are not excluded from understanding these fields for later amendments, e.g., EHT.

Table 1 illustrates fields of HE-SIG field for SU PPDUs and SU ER PPDUs. Table 2 illustrates field of HE-SIG field for MU PPDU. Table 3 illustrates field of HE-SIG field for TB PPDU. In Tables 1-3, one or more of the fields with an asterisk (*) are kept unchanged for the HE SIGA/Common SIGA 1310 subfield, in accordance with some embodiments, e.g., format, UL/DL, BSS color, spatial resuse, TXOP, CRC, and tail. Field reserved is changed to amendment type (e.g., B14 if HE-SIGA1) where a value of 1 is used to indicate the amendment is non-HE, e.g., EHT, and a value of 0 is used to indicate a HE amendment. The reserved bit is B14 of SIGA1 for SU PPDU, B7 of SIGA2 for MU PPDU, B23 of SIGA1 for TB PPDU, in accordance with some embodiments. The fields that do not have an asterisk can be repurposed for amendments after HE (IEEE 802.11ax) or kept the same, e.g., beam change, MC, GI+TLT, NSTS, coding, LDPC extra symbol, STBC, beamformed, PE disambiguity, and Doppler. As an example, MCS and bandwidth fields may be repurposed for amendments after HE (e.g., EHT) with the advantage that the fields with the asterisks may be used by HE and future amendments to increase interoperability.

| HE-SIGA1 | | | HE-SIGA2 | | |
|---|---|---|---|---|---|
| Bit | Field | Number of bits | Bit | Field | Number of bits |
| B0 | Format* | 1 | B0-B6 | TXOP* | 7 |
| B1 | Beam Change | 1 | B7 | Coding | 1 |
| B2 | UL/DL* | 1 | B8 | LDPC Extra Symbol Segment | 1 |
| B3-B6 | MCS | 4 | B9 | STBC | 1 |
| B7 | DCM | 1 | B10 | Beamformed | 1 |
| B8-B13 | BSS Color* | 6 | B11-B12 | Pre-FEC Padding Factor | 2 |
| B14 | ~~Reserved~~ Future Amendment Type | 1 | B13 | PE Disambiguate | 1 |
| B15-B18 | Spatial Reuse* | 4 | B14 | Reserved | 1 |
| B19-B20 | Bandwidth | 2 | B15 | Doppler | 1 |
| B21-B22 | GI + LTF Size | 2 | B16-B19 | CRC* | 4 |
| B23-B25 | NSTS And Midamble Periodicity | 3 | B20-B25 | Tail* | 6 |

Table 2 illustrates fields of HE-SIG field for MU PPDU.

TABLE 2

Identification of the fields from the HE-SIG field that are kept unchanged (*) in the Common SIGA field for MU PPDU

| HE-SIGA1 | | | HE-SIGA2 | | |
|---|---|---|---|---|---|
| Bit | Field | Number of bits | Bit | Field | Number of bits |
| B0 | UL/DL | 1 | B0-B6 | TXOP | 7 |
| B1-B3 | SIGB MCS | 3 | B7 | ~~Reserved~~ Future Amendment Type | 1 |

TABLE 2-continued

Identification of the fields from the HE-SIG field that are kept unchanged (*) in the Common SIGA field for MU PPDU

| HE-SIGA1 | | | HE-SIGA2 | | |
|---|---|---|---|---|---|
| Bit | Field | Number of bits | Bit | Field | Number of bits |
| B4 | SIGB DCM | 1 | B8-B10 | Number of HE-LTF Symbols And Midamble Periodicity | 3 |
| B5-B10 | BSS Color | 6 | B11 | LDPC Extra Symbol Segment | 1 |
| B1-B14 | Spatial Reuse | 4 | B12 | STBC | 1 |
| B15-B17 | Bandwidth | 3 | B13-B14 | Pre-FEC Padding Factor | 2 |
| B18-B21 | Number Of HE-SIG-B Symbols Or MU-MIMO Users | 4 | B15 | PE Disambiguity | 1 |
| B22 | SIGB Compression | 1 | B16-B19 | CRC | 4 |
| B23-B24 | GI + LTF Size | 2 | B20-B25 | Tail | 6 |
| B25 | Doppler | 1 | | | |

Table 3 illustrates fields of HE-SIG field for TB PPDU.

TABLE 3

Identification of the fields from the HE-SIG field that are kept unchanged (*) in the Common SIGA field for TB PPDU

| HE-SIGA1 | | | HE-SIGA2 | | |
|---|---|---|---|---|---|
| Bit | Field | Number of bits | Bit | Field | Number of bits |
| B0 | Format | 1 | B0-B6 | TXOP | 7 |
| B1-B6 | BSS Color | 6 | B7-B15 | Reserved | 9 |
| B7-B10 | Spatial Reuse 1 | 4 | B16-B19 | CRC | 4 |
| B11-B14 | Spatial Reuse 2 | 4 | B20-B25 | Tail | 6 |
| B15-B18 | Spatial Reuse 3 | 4 | | | |
| B19-B22 | Spatial Reuse 4 | 4 | | | |
| B23 | ~~Reserved~~ Future Amendment Type | 1 | | | |
| B24-B25 | Bandwidth | 2 | | | |

Table 4a illustrates common SIGA field for SU PPDU, SU ER PPDU if Future Amendment Type is set to 0 (in this case the Common SIGA field is identical to HE SIGA field). Table 4b—Common SIGA field for SU PPDU, SU ER PPDU if Future Amendment Type is set to 1.

In some embodiments, with a design where the Common SIG field reuses the HE-SIGA and keeps some of the fields (e.g., with the asterisk) in Tables 1-3, the reserved bit (B 14 for SU PPDU) is repurposed to be a 1 bit field that is set to 1 to indicate that the PPDU is from HE (IEEE 802.11ax), and is set to 0 to indicate that the PPDU is a generation after IEEE 802.11ax, e.g., (IEEE 802.11be/EHT, etc.)

In some embodiments, to differentiate a new amendment (or standard), e.g., EHT, and future ones, and to enable different SIG fields designs a future amendment field is used. When the future amendment type subfield is set to 1 (to indicate that it is not an HE PPDU), a SIG design can be different for each of these generations. A field is used, e.g., Amendment/PPDU Type subfield that indicates which of the future amendments the PPDU and SIGA are for. The field may be a 2 or 3 bit field (to allow for 4-8 future amendments), as in the Table 4b below. In some embodiments, the number of bits is different. This Amendment Type subfield would always be present in the Common SIGA version for every amendment in the same bit location, in accordance with some embodiments.

For instance, to signal an EHT PPDU, the Future Amendment Type subfield would be set to 0 (to indicate it is not HE) and the Amendment Type subfield would be set to 000 (to indicate specifically EHT), in accordance with some embodiments. All other bits (except the ones that were already fixed like BSS color, TxOP duration, the Future amendment Type and Amendment Type . . . ) can be used differently for EHT and for any future amendment. Note that other technologies such as 3GPP NR could also use one entry in this Future amendment Type if they decide to transmit this preamble before each of their PPDU in order to benefit from the coexistence features.

TABLE 4a

Common SIGA field for SU PPDU, SU ER PPDU if Future Amendment Type is set to 0 (in this case the Common SIGA field is identical to HE SIGA field)

| Common SIGA1 | | | Common SIGA2 | | |
|---|---|---|---|---|---|
| Bit | Field | Number of bits | Bit | Field | Number of bits |
| B0 | Format | 1 | B0-B6 | TXOP | 7 |
| B1 | Beam Change | 1 | B7 | Coding | 1 |
| B2 | UL/DL | 1 | B8 | LDPC Extra Symbol Segment | 1 |
| B3-B6 | MCS | 4 | B9 | STBC | 1 |
| B7 | DCM | 1 | B10 | Beamformed | 1 |
| B8-B13 | BSS Color | 6 | B11-B12 | Pre-FEC Padding Factor | 2 |
| B14 | ~~Reserved~~ Future Amendment Type | 1 | B13 | PE Dis-ambiguity | 1 |
| B15-B18 | Spatial Reuse | 4 | B14 | Reserved | 1 |
| B19-B20 | Bandwidth | 2 | B15 | Doppler | 1 |
| B21-B22 | GI + LTF Size | 2 | B16-B19 | CRC | 4 |
| B23-B25 | NSTS And Midamble Periodicity | 3 | B20-B25 | Tail | 6 |

Table 4b—Common SIGA field for SU PPDU, SU ER PPDU if Future Amendment Type is set to 1.

TABLE 4b

Common SIGA field for SU PPDU, SU ER PPDU of Future Amendment Type is set to 1 (in this case the Common SIGA field is completely redesigned, except for some fields from HE-SIGA that are kept in the same location)

| Common SIGA1 | | | Common SIGA2 | | |
|---|---|---|---|---|---|
| Bit | Field | Number of bits | Bit | Field | Number of bits |
| B0 | Format? | 1 | B0-B6 | TXOP | 7 |
|  |  |  | B7 |  |  |
| B2 | UL/DL? | 1 | B8 |  |  |
|  |  |  | B9 |  |  |
|  |  |  | B10 |  |  |
| B8-B13 | BSS Color | 6 | B11-B12 |  |  |
| B14 | ~~Reserved~~ Future Amendment Type | 1 | B13 |  |  |

TABLE 4b-continued

Common SIGA field for SU PPDU, SU ER PPDU of Future Amendment Type is set to 1 (in this case the Common SIGA field is completely redesigned, except for some fields from HE-SIGA that are kept in the same location)

| Common SIGA1 | | | Common SIGA2 | | |
|---|---|---|---|---|---|
| Bit | Field | Number of bits | Bit | Field | Number of bits |
| B15-B18 | Spatial Reuse ? | 4 | B14 |  |  |
| B19-B21 | Amendment Type | 3 | B15 |  |  |
|  |  |  | B16-B19 | CRC | 4 |
|  |  |  | B20-B25 | Tail | 6 |

In some embodiments, HE STAs (e.g., legacy STA 506) are configured to receive as follows. According to current IEEE 802.11ax specification, an HE STA that receives an EHT PPDU that is designed using the proposal (common SIGA field with the BSS color, TxOP duration, CRC, tail) at the same bit location and with the Reserved bit set to 0 (non-reserved bit value)) will behave as follows: It will process the PPDU as an HE PPDU, detect PPDU type (SU/MU/TB), and start detecting HE-SIGA. If HE-SIGA CRC is valid, it looks at the reserved bit. The HE STA sees that it is set to 0 and therefore the PPDU is not an HE PPDU. The HE STA captures the BSS color and TxOP duration, and applies the functionalities that it can exploit based on (spatial reuse, intra-PPDU power save, NAV setting, . . . ). The HE STA then stops reception.

In some embodiments, EHT STA 504 and/or EHT AP 502 are configured to operate as follows. An EHT STA that receives an EHT PPDU that is designed using the current proposal (common SIGA field with the BSS color, TxOP duration, CRC, tail) at the same bit location and with the Reserved bit set to 1 (non-reserved bit value)) behaves as follows: the EHT STA 504 and/or EHT AP 502 processes the PPDU as an HE PPDU (and any PPDU from future amendments), detects PPDU type (SU/MU/TB), and starts detecting Common SIGA field.

If Common SIG field CRC is valid, the EHT STA 504 and/or EHT AP 502 examines the reserved bit (Future Amendment Type subfield). The EHT STA 504 and/or EHT AP 502 sees that it is set to 0 and that therefore the PPDU is not an HE PPDU, it processes the Amendment Type subfield, and detects it is set to 000 for EHT. At this point, the packet is to be processed as an EHT PPDU, interprets the fields in the Common SIGA field appropriately, along with any newly defined preamble after the common SIG field (if there is an EHT SIGA field right after the Common SIGA field). The values of "0" and "000" may be different.

Figure 14:
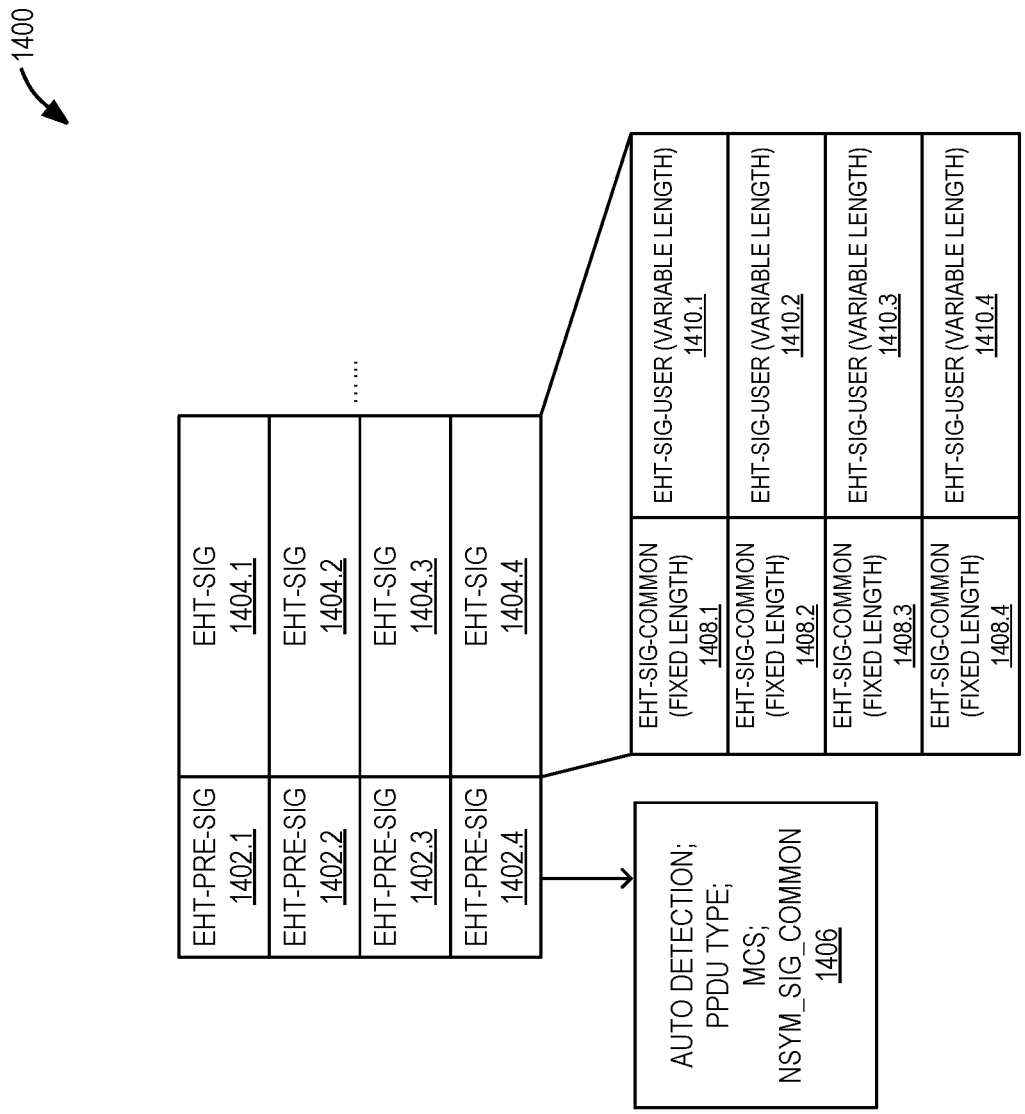
FIG. 14 illustrates an EHT SIG, in accordance with some embodiments.

FIG. 14 illustrates a EHT SIG 1400, in accordance with some embodiments. Illustrated in FIG. 14 is EHT-PRE-SIG 1402, EHT-SIG 1404, auto detection 1406, EHT-SIG-Common 1408, and EHT-SIG-USER 1410. The SIG field in EHT has two part: EHT-Pre-SIG 1402 and EHT-SIG 1404. The EHT-Pre-SIG 1402 has one symbol for a regular PPDU. The EHT-Pre-SIG 1402 can have two symbols that are repeated for extended range PPDU. The number of symbols in the EHT-Pre-SIG (one or two) can be indicated before EHT-Pre-SIG. For instance, it can be indicated by set the LENGTH indicated in the length field of the L-SIG, e.g., a requirement that mod(LENGTH,3)=0. In another example, it can be indicated by applying QBPSK modulation in the 1st symbol of Pre-SIG. The EHT-Pre-SIG 1402 includes the fields in Table 5, in accordance with some embodiments.

EHT-Pre-SIG 1402 may do one or more of the following: 1) Indicate the standard or amendment, e.g. IEEE 802.11be or a future standard or amendment. 2) Indicate the PPDU type for each standard or amendment indicated. These two can be combined together for joint indication of standard and amendment and PPDU type (e.g., EHT and EHT TB PPDU). Indicate the information needed to decode the EHT-SIG-Common field 1408. E.g. the MCS and number of symbols of EHT-SIG-Common 1408. The fields with asterisks are disclosed above.

TABLE 5

Content of EHT-Pre-SIG

| Field | Number of bits |
|---|---|
| Auto detection* | 3 or 4 |
| PPDU type* | 3 |
| MCS of EHT-SIG-Common* | 3 or 2 |
| Reserved* | 2 |
| CRC | 6 or 8 |
| Tail | 6 |

The structure and content of the EHT-SIG-Common field 1408 may include a fixed of symbols, e.g., 2, 3, or 4 symbols. The frequency domain structure could be per 20 MHz repeated as in HE-SIGA, e.g., the EHT-SIG-Common field 1408 is transmitted on each of the 20 MHz channels of a bandwidth. This may enable a 20 MHz STA to decode the information in EHT-SIG-Common field 1408.

The EHT-SIG-Common field 1408 may indicate the coexistence information, which can be decoded and parsed by an EHT STA 506 and future amendment/standard STAs. The size of the coexistence information can be changed depending on the amendment/standard.

Figure 15:
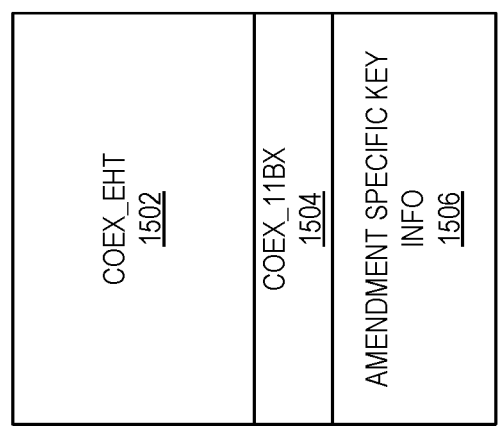
FIG. 15 illustrates content of EHT SIG Common, in accordance with some embodiments.

FIG. 15 illustrates content of EHT SIG Common 1500, in accordance with some embodiments. Illustrated in FIG. 15 is coexistent (coex) EHT 1502, coex_11bx 1504, and amendment specific key information (info) 1506. 11bx indicates an amendment after IEEE 802.11be. The coex EHT info can be used by EHT STAs and beyond; coex_11bx can be used by 11bx STAs and beyond, but coex_11bx info cannot be used by EHT STAs. The coex EHT 1502 is scalable for different amendments. The coex EHT 1502 bit indexes should be fix regardless of amendment, so that legacy STAs 506 can decode future amendment PPDUs and parse the Coex EHT 1502. EHT SIG common 1500 may indicate one or more of the following: BW, MCS of EHT-SIG-User, LTF type, etc.

Figure 16:
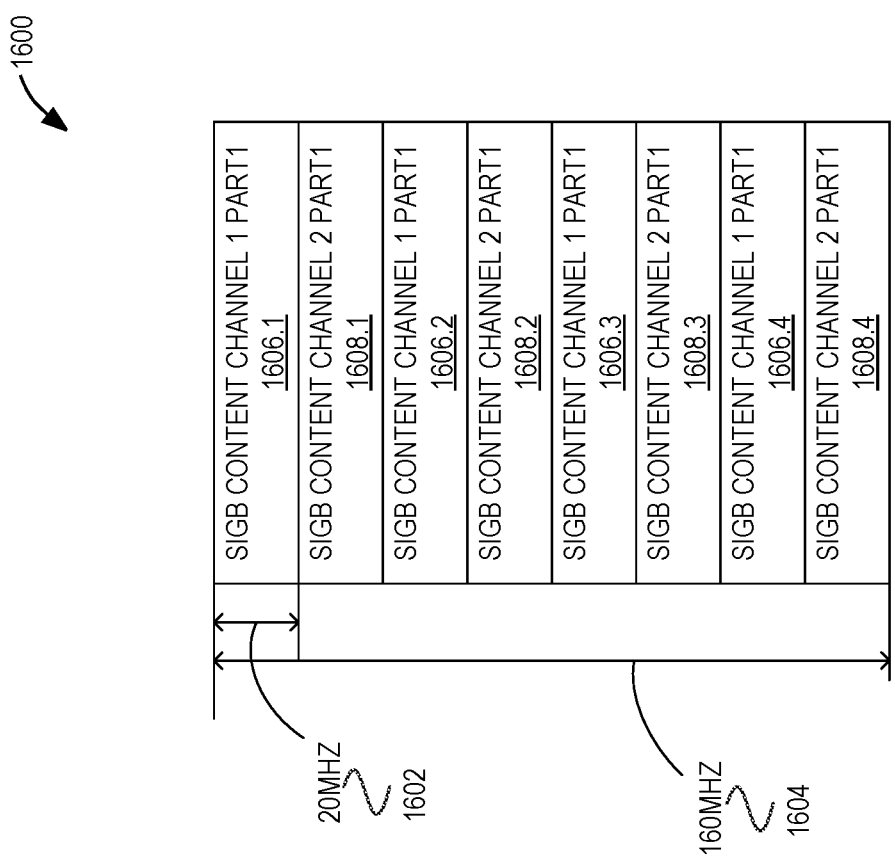
FIG. 16 illustrates EHT SIG User field for a bandwidth less than or equal to 160 MHz, in accordance with some embodiments.

FIG. 16 illustrates EHT SIG User field 1600 for a bandwidth less than or equal to 160 MHz, in accordance with some embodiments. Illustrated in FIG. 16 is 20 Me structure and content of the EHT-SIG-User field. The EHT-SIG-User field uses the HE-SIGB structure for bandwidth less than or equivalent to 160 MHz, in accordance with some embodiments.

Figure 17:
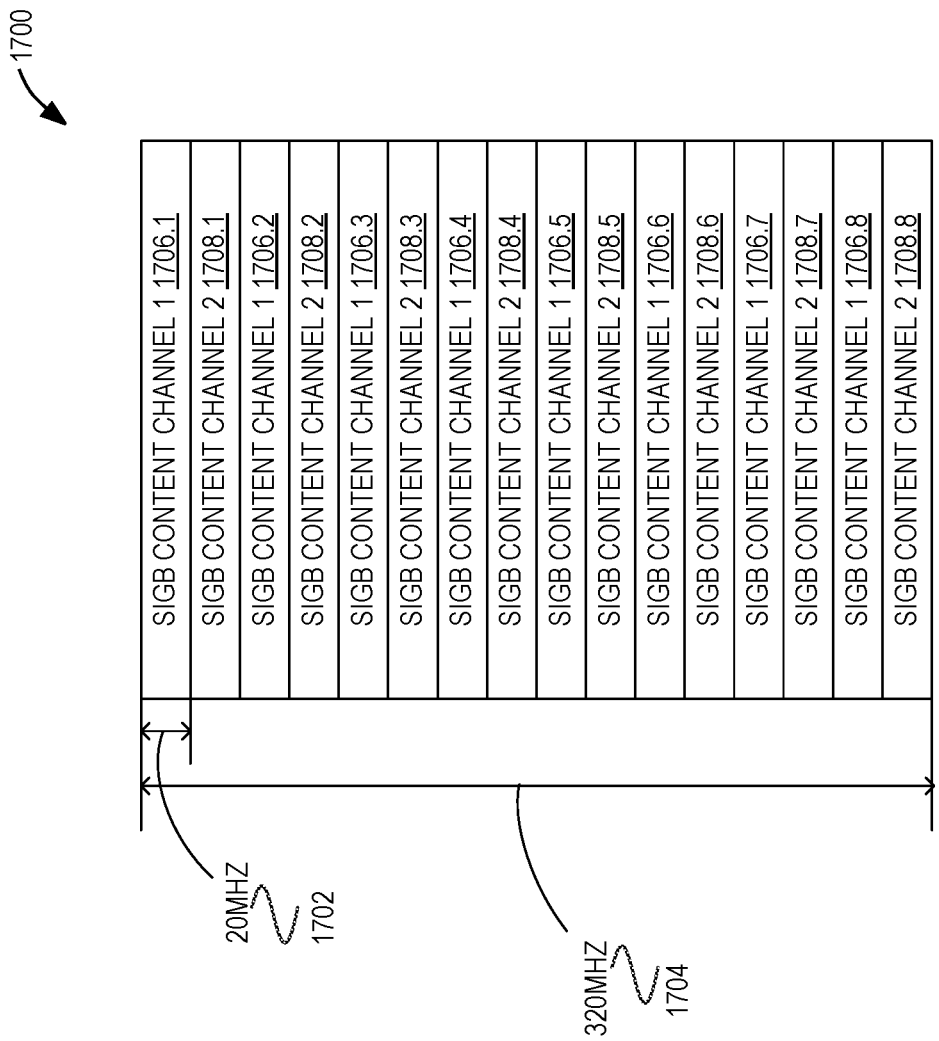
FIGS. 17-19 illustrates EHT SIG USER for a bandwidth of 320, in accordance with some embodiments.
Figure 18:
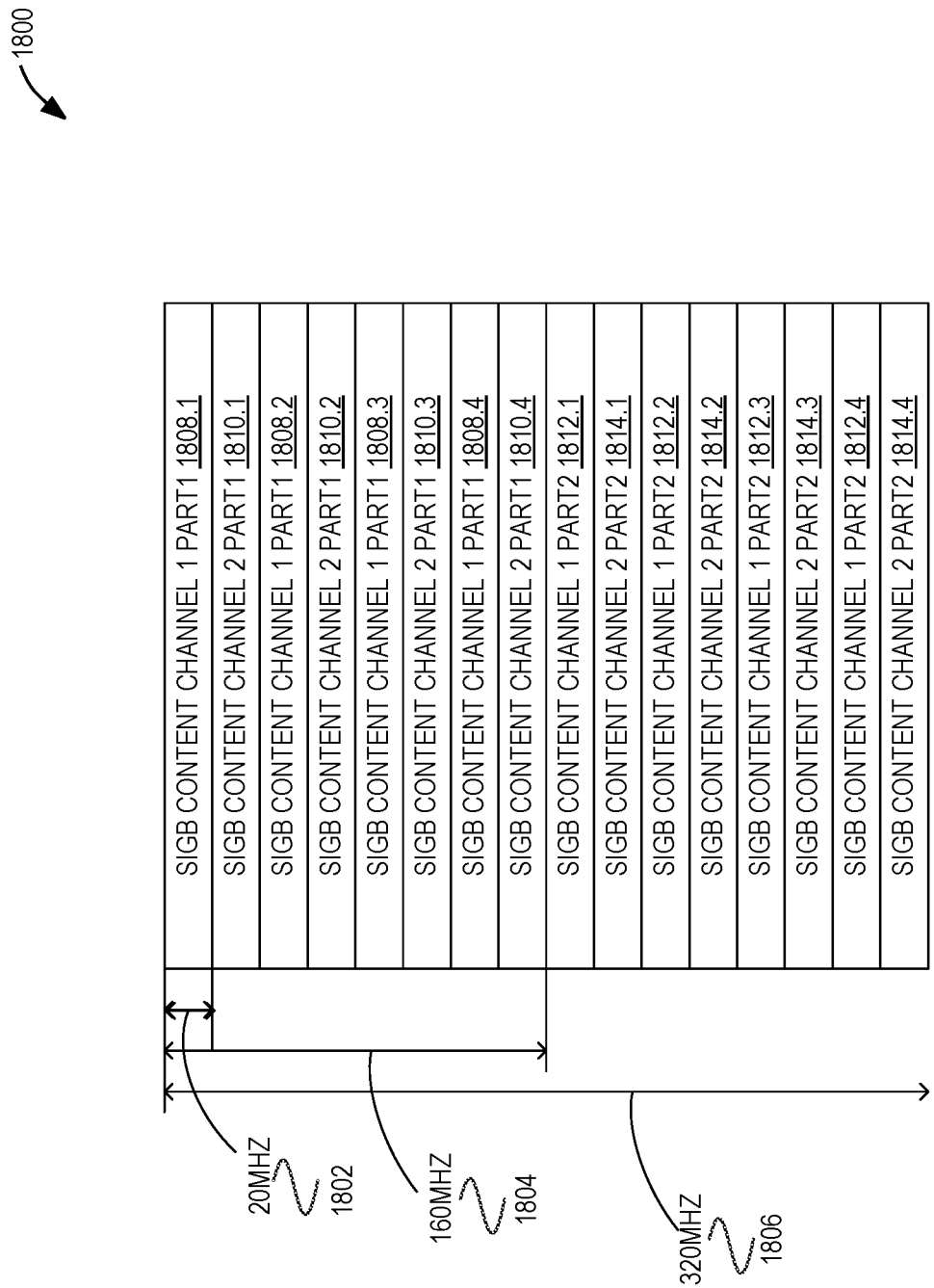
Figure 19:
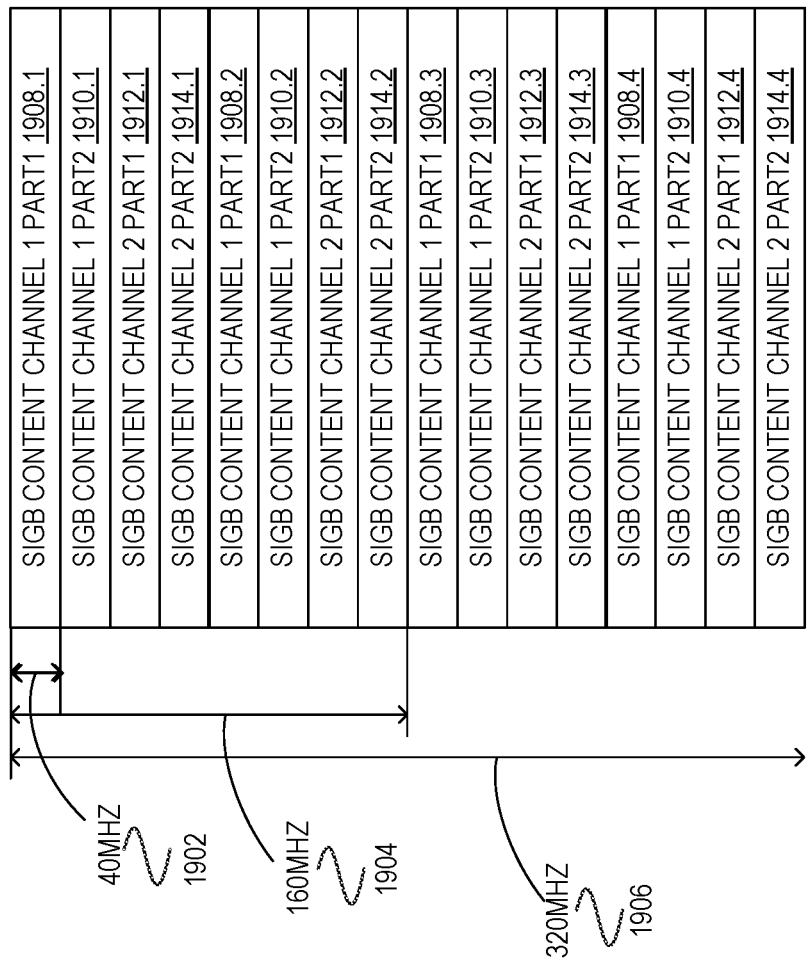

FIGS. 17-19 illustrates EHT SIG USER for a bandwidth of 320, in accordance with some embodiments. Illustrated in FIG. 17 is 20 MHz 1702, 320 MHz 1704, SIGB content channel 1706, and SIGB content channel 2 1708. Illustrated in FIG. 18 20 MHz 1802, 160 MHz 1804, 320 MHz 1806, SIGB content channel 1 part 1 1808, SIGB content channel 2 part1 1810, SIGB content channel 1 part 2 1812, and SIGB content channel 2 part 2 1814. FIG. 19 illustrates 40 MHz 1902, 160 MHz 1904, 320 MHz 1906, SIGB content channel 1 part1 1908, SIGB content channel 1 part2 1910, SIGB content channel 2 part 1 1912, and SIGB content channel 2 part 2 1914. For BW=320 MHz, reuse the repetition of every other 20 MHz will lead to the overhead issue as shown in FIG. 4a. I.e. each content channel is repeated 8 times. To improve the efficiency, EHT-SIG-User field is split in time domain as illustrated in FIG. 18. And, the first part is transmitted in the upper 160 MHz; the 2nd part is transmitted in the lower 160 MHz. This way, each content channel is repeated 4 times. Another variation is shown in FIG. 19. Instead of every other 20 MHz repetition, we propose to use every other 40 MHz repetition. Then each content channel is repeated 4 times to keep it the same efficiency as 160 MHz.

Figure 20:
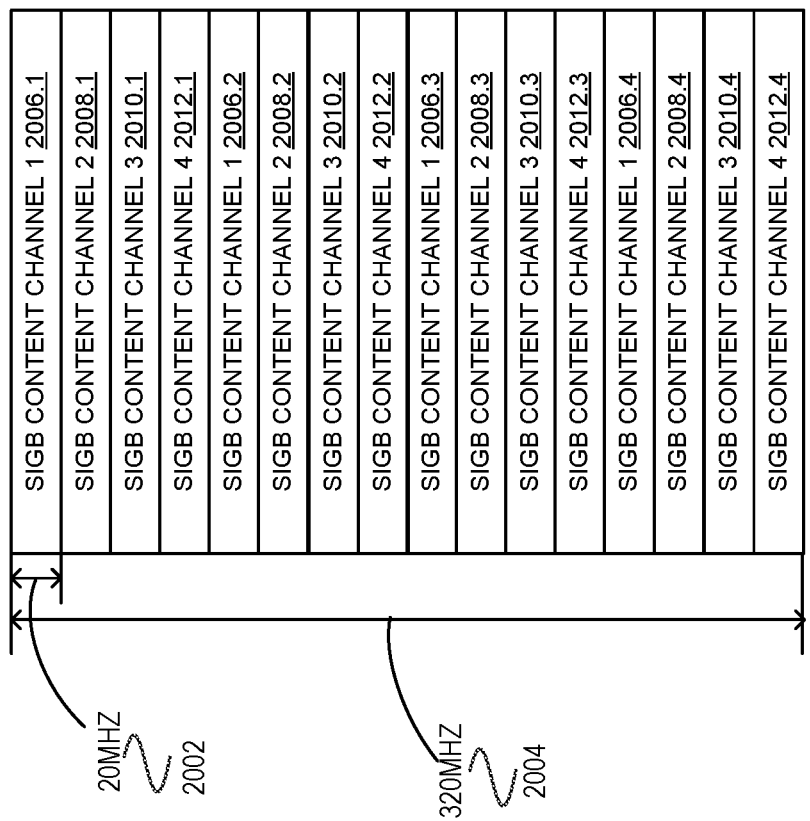
FIG. 20 illustrates extended content channel for 320 MHz, in accordance with some embodiments.

FIG. 20 illustrates extended content channel for 320 MHz, in accordance with some embodiments. Illustrated in FIG. 20 is 20 MHz 2002, 320 MHz 2004, SIGB content channel 1 2006, SIGB content channel 2 2008, SIGB content channel 3 2010, and SIGB content channel 4 2012. FIG. 20 is to add more content channel, e.g. from two content channel to 4 content channels. For 80 MHz, each content channel will indicate the user information of the 20 MHz that overlap with the content channel. For 160, each content channel will be repeated twice; for 320, each content channel will be repeated four times as shown in FIG. 20. If we have 8 content channels for 320 MHz, each content channel will be repeated twice.

Figure 21:
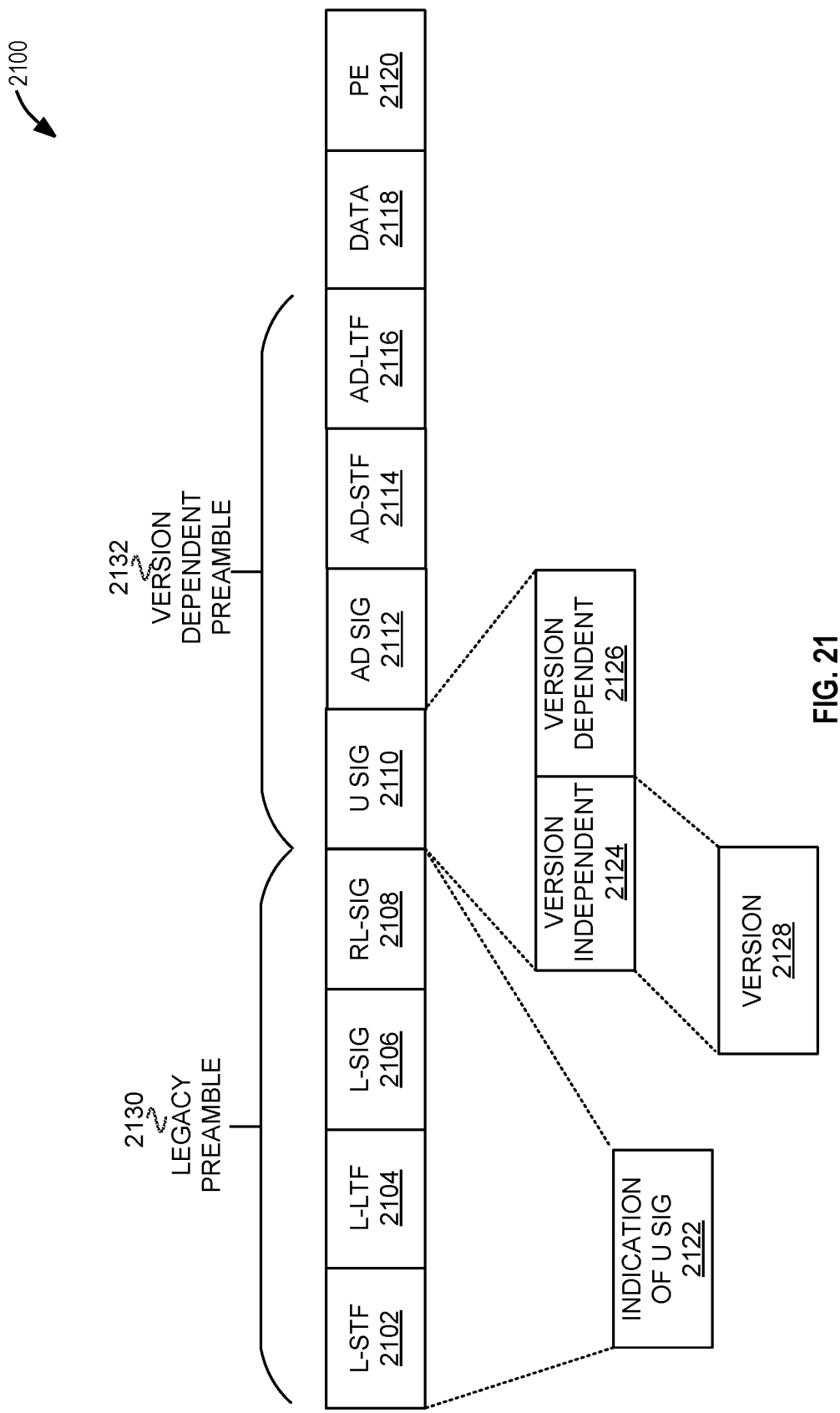
FIG. 21 illustrates a PPDU with a universal signal field (U-SIG), in accordance with some embodiments.

FIG. 21 illustrates a PPDU 2100 with a universal signal field (U-SIG), in accordance with some embodiments. Illustrated in FIG. 21 is PPDU 2100, which includes one or more of L-STF 2102, L-LTF 2104, L-SIG 2106, RL-SIG 2108, U-SIG 2110, version dependent (VD) SIG 2112, VD-STF 2114, VD-LTF 2116, data field carrying one or more PSDUs (data 2118), and PE 2120. The legacy preamble 2130 includes an indication of U-SIG 2122. In some embodiments, the indication of U-SIG 2122 is the L-SIG 2106, RL-SIG 2108, and setting the length field in the L-SIG 2106 (and RL-SIG 2108 in some embodiments) to a value so that the length indicated mod 3 is equal to 0. The indication of U SIG 2122 may include one or more symbols being transmitted in accordance with BPSK and/or QBPSK. The version dependent preamble 2132 includes the U-SIG 2110. The U-SIG 2110 includes a version independent portion 2124 and version dependent portion 2126. The version independent portion 2124 includes a version field 2128 that indicates the version with which the PPDU is encoded. For example, IEEE 802.11be or EHT. The version field 2128 is 2 to 12 bits, in accordance with some embodiments. The version field 2128 may indicate a PHY version identifier. The version field 2128 may be in a fixed position of bits after the legacy preamble 2130, in accordance with some embodiments.

The version independent portion 2124 may include one or more fields disclosed herein, e.g., UL/DL indication (1 bit), BSS color field, TXOP duration field, and other fields as disclosed herein, e.g., see Tables 1-5, PPDU type, etc. The version dependent portion 2126 may have different meanings and/or assignments according to the value indicated in the version field 2128.

The AD SIG 2112 may be variable length. The AD SIG 2112 indicates how the data field 2128 is encoded, in accordance with some embodiments. The AD SIG 2112 includes a MCS field that indicates how the data field 2118 is encoded in accordance with some embodiments. One or more fields may indicate a number and location of spatial streams. One or more fields may indicate a bandwidth.

In some embodiments, the version independent portion 2124 and version dependent portion 2126 are separately encoded with separate error detecting/correcting codes (e.g., cyclic redundancy check, CRC codes) and tail bits. In some embodiments, the version independent portion 2124 and version dependent portion 2126 are encoded together that includes a CRC field and, in some embodiments, a tail bits field.

Figure 22:
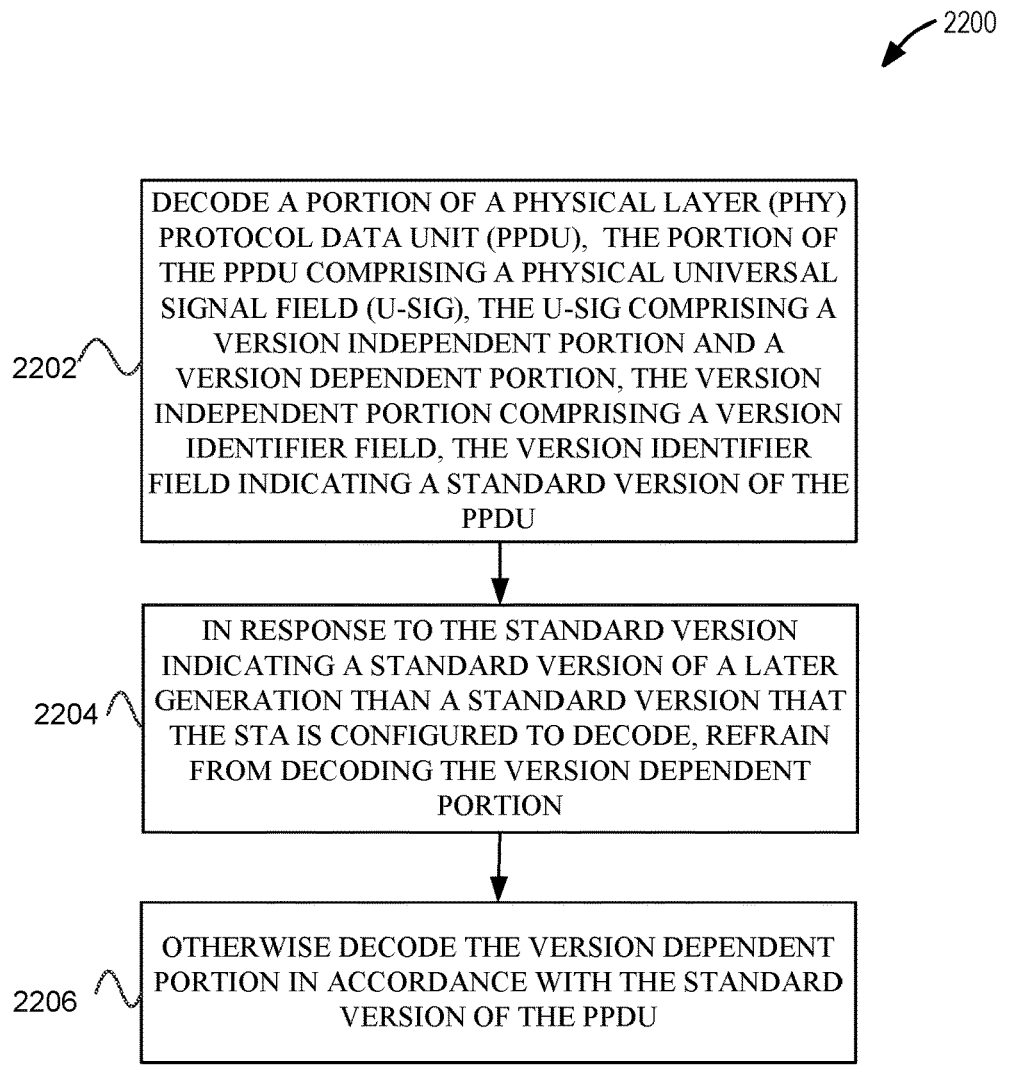
FIG. 22 illustrates a method of decoding a PPDU with a universal signal field (U-SIG), in accordance with some embodiments.

FIG. 22 illustrates a method 2200 of decoding a PPDU with a universal signal field (U-SIG), in accordance with some embodiments. The method 2200 begins at operation 2202 with decoding a portion of a PPDU, the portion of the PPDU including a physical universal signal field (U-SIG), the U-SIG including a version independent portion and a version dependent portion, the version independent portion comprising a version identifier field, the version identifier field indicating a standard version of the PPDU. For example, EHT STA 504 and/or EHT AP 502 may decode PPDU 800, 900, 1200, 1300, 1400, 1500, and/or 2100.

The method 2200 continues at operation 2204 with in response to the standard version indicating a standard version of a later generation than a standard version that the STA is configured to decode, refrain from decoding the version dependent portion. For example, if the EHT STA 504 and/or EHT AP 502 decodes common portion 822, common portion 922, amendment type 1002, HE SIGA/common SIGA 1310, EHT-PRE-SIG 1402, COEX EHT 1502, and/or version 2128 and determines that the version 2128 is a later version than the EHT STA 504 and/or EHT AP 502 is configured to operate (or the EHT STA 504 and/or EHT AP 502 is not currently operating to decode PPDUs with the version indicated by version 218), then the EHT STA 504 and/or EHT AP 502 refrains from decoding version dependent portions of the PPDU.

The method 2200 continues at operation 2206 with otherwise, decoding the version dependent portion in accordance with the standard version of the PPDU. For example, the EHT STA 504 and/or EHT AP 502 decodes AD portion 824, EHT portion 924, version dependent bits 1100, the rest of HE SIGA/common SIGA 1310, EHT-SIG 1404, amendment specific key info 1506, and/or version dependent portion 2126.

The method 2200 may be performed by an EHT STA 504, an EHT AP 502, an apparatus of an EHT STA 504, an apparatus of a EHT AP 502, in accordance with some embodiments. Method 2200 may include one or more additional operations. One or more operations of method 2200 may be optional. One or more of the operations may be performed in a different order than illustrated. The terms EHT and be may be used interchangeable in accordance with some embodiments.

Figure 23:
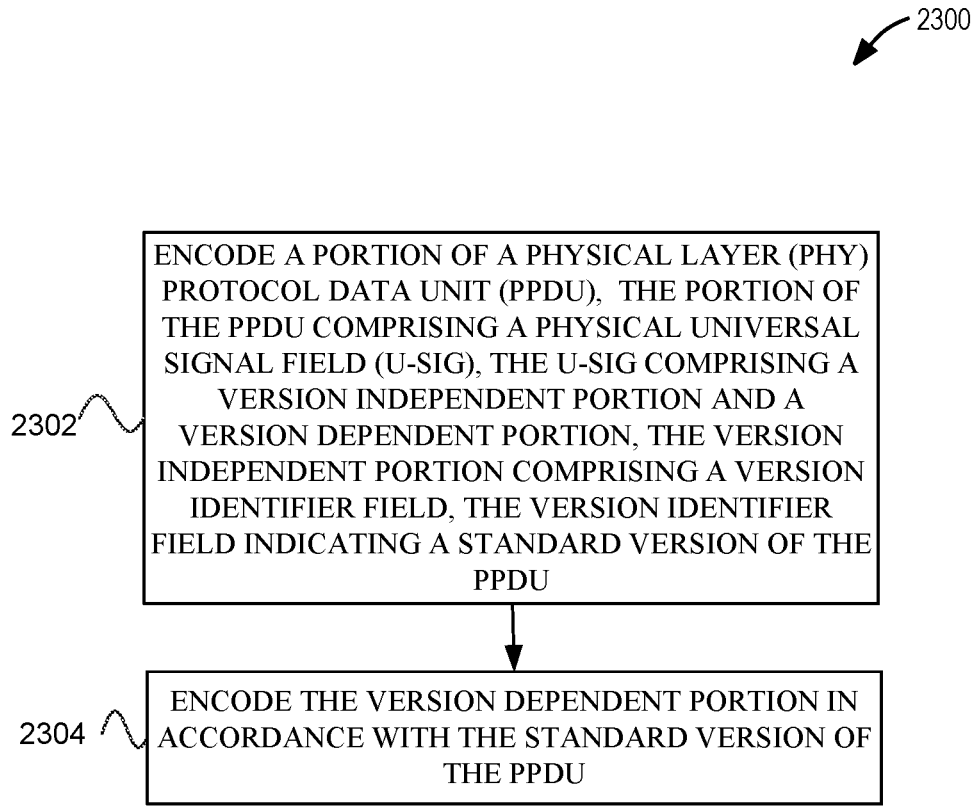
FIG. 23 illustrates a method of decoding a PPDU with a universal signal field (U-SIG), in accordance with some embodiments.

FIG. 23 illustrates a method 2300 of decoding a PPDU with a universal signal field (U-SIG), in accordance with some embodiments. The method 2300 begins at operation 2302 with encoding a portion of a PPDU, the portion of the PPDU comprising a U-SIG, the U-SIG comprising a version independent portion and a version dependent portion, the version independent portion comprising a version identifier field, the version identifier field indicating a standard version of the PPDU. For example, EHT STA 504 and/or EHT AP 502 may encode PPDU 800, 900, 1200, 1300, 1400, 1500, and/or 2100. For example, EHT STA 504 and/or EHT AP 502 encodes common portion 822, common portion 922, amendment type 1002, HE SIGA/common SIGA 1310, EHT-PRE-SIG 1402, COEX EHT 1502, and/or version 2128 with a version 2128 the EHT AP 502 and/or EHT STA 504 is configured to operate with.

The method 2300 continues at operation 2304 with encoding the version dependent portion in accordance with the standard version of the PPDU. For example, the EHT STA 504 and/or EHT AP 502 encodes AD portion 824, EHT portion 924, version dependent bits 1100, the rest of HE SIGA/common SIGA 1310, EHT-SIG 1404, amendment specific key info 1506, and/or version dependent portion 2126.

The method 2300 may be performed by an EHT STA 504, an EHT AP 502, an apparatus of an EHT STA 504, an apparatus of a EHT AP 502, in accordance with some embodiments. Method 2300 may include one or more additional operations. One or more operations of method 2300 may be optional. One or more of the operations may be performed in a different order than illustrated. The terms EHT and be may be used interchangeable in accordance with some embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising memory; and processing circuitry coupled to the memory, the processing circuitry configured to:
   decode a portion of a physical layer (PHY) protocol data unit (PPDU), the portion of the PPDU comprising a physical universal signal field (U-SIG), the U-SIG comprising a version independent portion and a version dependent portion, the version independent portion comprising a version identifier field, the version identifier field indicating a standard version of the PPDU; and
   in response to the standard version of the PPDU indicating a standard version of a later generation than a standard version that the STA is configured to decode, refrain from decoding the version dependent portion, otherwise
   decode the version dependent portion in accordance with the standard version of the PPDU.

2. The apparatus of claim 1, wherein the processing circuitry is further configured to:
   decode a legacy preamble portion of the PPDU, the legacy preamble portion before the U-SIG, wherein the legacy preamble comprises a legacy signal field (L-SIG) and a repeated legacy signal field (RL-SIG), wherein the L-SIG comprises a length field, the length field indicating a length of the PPDU, wherein the length mod 3 is equal to zero.

3. The apparatus of claim 2, wherein before the L-SIG, the PPDU further comprises a legacy short-training field (L-STF) and a legacy long-training field (L-LTF).

4. The apparatus of claim 1, wherein the processing circuitry is further configured to:
   decode common fields of the version independent portion, wherein the common fields comprise one or more from the following group: an uplink/downlink (UL/DL) flag, a transmission opportunity (TXOP) duration, basic service set (BSS) color field.

5. The apparatus of claim 4, wherein the UL/DL flag indicates whether the PPDU is an UL PPDU or a DL PPDU, the TXOP duration indicates a duration of a TXOP of the PPDU, and the BSS color field indicates a color of a BSS of a wireless device that transmitted the PPDU.

6. The apparatus of claim 1, wherein the portion of the PPDU is a first portion and wherein the processing circuitry is further configured to:
  decode a second portion of the PPDU, the second portion of the PPDU being after the first portion of the PPDU, wherein the decoding is performed based on information from decoding the version dependent portion.

7. The apparatus of claim 6, wherein the second portion comprises a version dependent signal field, the version dependent signal field comprising a modulation and coding scheme (MCS) field, the MCS field indicating an encoding of the data field.

8. The apparatus of claim 1, wherein the standard version of the PPDU indicates extremely-high throughput (EHT) and the PPDU comprises after the U-SIG an EHT signal field, the EHT signal field indicating an encoding of a data portion of the PPDU, the data portion after the EHT signal field.

9. The apparatus of claim 1, wherein the U-SIG further comprises an indication of a type of PPDU.

10. The apparatus of claim 1, wherein the version identifier field is in a fixed bit position within the U-SIG.

11. The apparatus of claim 1, wherein the U-SIG is transmitted on each 20 MHz channel of a bandwidth, and wherein a data portion of the PPDU is transmitted on the bandwidth.

12. The apparatus of claim 1 further comprising: mixer circuitry to downconvert radio frequency (RF) signals to baseband signals; and synthesizer circuitry, the synthesizer circuitry comprising one of a fractional-N synthesizer or a fractional N/N+1(N>=1) synthesizer, the synthesizer circuitry configured to generate an output frequency for use by the mixer circuitry, wherein the processing circuitry is configured to decode the baseband signals, the baseband signals including the PPDU.

13. The apparatus of claim 1 further comprising: mixer circuitry to down-convert radio frequency (RF) signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the PPDU.

14. A non-transitory computer-readable storage medium that stores instructions for execution by one or more processors of an apparatus of a station (STA), the instructions to configure the one or more processors to:
  decode a portion of a physical layer (PHY) protocol data unit (PPDU), the portion of the PPDU comprising a physical universal signal field (U-SIG), the U-SIG comprising a version independent portion and a version dependent portion, the version independent portion comprising a version identifier field, the version identifier field indicating a standard version of the PPDU; and
  in response to the standard version of the PPDU indicating a standard version of a later generation than a standard version of the STA, refrain from decoding the version dependent portion, otherwise decode the version dependent portion in accordance with the standard version of the PPDU.

15. The non-transitory computer-readable storage medium of claim 14, wherein the instructions further configure the one or more processors to:
  decode a legacy preamble portion of the PPDU, the legacy preamble portion before the U-SIG, wherein the legacy preamble comprises a legacy signal field (L-SIG) and a repeated legacy signal field (RL-SIG), wherein the L-SIG comprises a length field, the length field indicating a length of the PPDU, wherein the length mod 3 is equal to zero.

16. An apparatus of a extremely high throughput (EHT) access point (AP), the apparatus comprising memory; and processing circuitry coupled to the memory, the processing circuitry configured to:
  decode a portion of a physical layer (PHY) protocol data unit (PPDU), the portion of the PPDU comprising a physical universal signal field (U-SIG), the U-SIG comprising a version independent portion and a version dependent portion, the version independent portion comprising a version identifier field, the version identifier field indicating a standard version of the PPDU; and
  in response to the standard version of the PPDU indicating a standard version of a later generation than a standard version that the EHT AP is configured to decode, refrain from decoding the version dependent portion, otherwise decode the version dependent portion in accordance with the standard version of the PPDU.

17. The apparatus of claim 16, wherein the processing circuitry is further configured to:
  decode a legacy preamble portion of the PPDU, the legacy preamble portion before the U-SIG, wherein the legacy preamble comprises a legacy signal field (L-SIG) and a repeated legacy signal field (RL-SIG), wherein the L-SIG comprises a length field, the length field indicating a length of the PPDU, wherein the length mod 3 is equal to zero.

18. The apparatus of claim 17, wherein before the L-SIG, the PPDU further comprises a legacy short-training field (L-STF) and a legacy long-training field (L-LTF).

19. The apparatus of claim 16, wherein the processing circuitry is further configured to:
  decode common fields of the version independent portion, wherein the common fields comprise one or more from the following group: an uplink/downlink (UL/DL) flag, a transmission opportunity (TXOP) duration, basic service set (BSS) color field.

20. The apparatus of claim 16 further comprising: mixer circuitry to downconvert radio frequency (RF) signals to baseband signals; and synthesizer circuitry, the synthesizer circuitry comprising one of a fractional-N synthesizer or a fractional N/N+1(N>=1) synthesizer, the synthesizer circuitry configured to generate an output frequency for use by the mixer circuitry, wherein the processing circuitry is configured to decode the baseband signals, the baseband signals including the PPDU.

* * * * *